(12) United States Patent
Li et al.

(10) Patent No.: US 11,868,009 B2
(45) Date of Patent: Jan. 9, 2024

(54) LIQUID CRYSTAL DISPLAY PANEL AND METHOD FOR MANUFACTURING THE SAME, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Bowen Li, Beijing (CN); Feifei Wang, Beijing (CN); Hongming Zhan, Beijing (CN); Kaixuan Wang, Beijing (CN); Lintao Ji, Beijing (CN); Xinli Ma, Beijing (CN); Xiaofeng Yin, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 55 days.

(21) Appl. No.: 17/630,977

(22) PCT Filed: Dec. 28, 2020

(86) PCT No.: PCT/CN2020/140381
§ 371 (c)(1),
(2) Date: Jan. 28, 2022

(87) PCT Pub. No.: WO2022/140983
PCT Pub. Date: Jul. 7, 2022

(65) Prior Publication Data
US 2023/0221599 A1    Jul. 13, 2023

(51) Int. Cl.
*G02F 1/13363*    (2006.01)
*G02F 1/1337*    (2006.01)
*G02F 1/1335*    (2006.01)

(52) U.S. Cl.
CPC .... *G02F 1/13363* (2013.01); *G02F 1/133531* (2021.01); *G02F 1/133749* (2021.01)

(58) Field of Classification Search
CPC .......... G02F 1/13363; G02F 1/133749; G02F 1/133531
See application file for complete search history.

(56) References Cited

U.S. PATENT DOCUMENTS 6,285,430 B1    9/2001    Saito
2002/0196385 A1    12/2002    He et al.
(Continued)

FOREIGN PATENT DOCUMENTS

| CN | 1834750 A | 9/2006 |
|---|---|---|
| CN | 101943825 | 1/2011 |

(Continued)

OTHER PUBLICATIONS

PCT International Search Report (w/ English translation) and Written Opinion for corresponding PCT Application No. PCT/CN2020/140381, dated Sep. 29, 2021, 12 pages.
(Continued)

*Primary Examiner* — Nathanael R Briggs
(74) *Attorney, Agent, or Firm* — Dority & Manning, P.A.

(57) ABSTRACT

A liquid crystal display panel includes a first polarizer, a second polarizer, a liquid crystal layer including first liquid crystal molecules, a first optical compensation layer between the liquid crystal layer and any of the first polarizer and the second polarizer, a second optical compensation layer on a same side of the liquid crystal layer as the first optical compensation layer. In a non-powered state of the liquid crystal display panel orthographic projections of optical axes of the first liquid crystal molecules on the first polarizer, which are perpendicular to an orthographic projection of an optical axis of the first optical compensation layer on the first
(Continued)

polarizer, are parallel to any of transmission axes of the first polarizer and the second polarizer that are perpendicular to each other. An optical axis of the second optical compensation layer is perpendicular to a plane where the second optical compensation layer is located.

15 Claims, 17 Drawing Sheets

(56) References Cited

U.S. PATENT DOCUMENTS

| | | | |
|---|---|---|---|
| 2005/0140900 A1* | 6/2005 | Jeon | G02F 1/133634 |
| | | | 349/117 |
| 2006/0221281 A1 | 10/2006 | Kobayashi | |
| 2009/0002606 A1 | 1/2009 | Tomonaga et al. | |
| 2011/0141415 A1 | 6/2011 | Lee | |
| 2014/0168557 A1 | 6/2014 | Qin | |
| 2015/0022763 A1 | 1/2015 | Kim et al. | |
| 2015/0261028 A1 | 9/2015 | Jin et al. | |
| 2016/0062165 A1 | 3/2016 | Kang et al. | |
| 2020/0103701 A1 | 4/2020 | Hasegawa et al. | |
| 2020/0142234 A1 | 5/2020 | Iwasaki et al. | |

FOREIGN PATENT DOCUMENTS

| | | |
|---|---|---|
| CN | 105334670 | 2/2016 |
| CN | 211979379 | 11/2020 |
| CN | 112099270 | 12/2020 |
| JP | 2008176281 A | 7/2008 |

OTHER PUBLICATIONS

Chinese Office Action (with English translation) received in corresponding CN Application No. 202080003757.X, dated Aug. 4, 2023, 15 pages.

* cited by examiner

LIQUID CRYSTAL DISPLAY PANEL AND METHOD FOR MANUFACTURING THE SAME, AND DISPLAY APPARATUS

CROSS-REFERENCE TO RELATED APPLICATION

This application is a national phase entry under 35 USC 371 of International Patent Application No. PCT/CN2020/140381 filed on Dec. 28, 2020, which is incorporated herein by reference in its entirety.

TECHNICAL FIELD

The present disclosure relates to the field of display technologies, and in particular, to a liquid crystal display panel and a method for manufacturing the same, and a display apparatus.

BACKGROUND

Liquid crystal displays (LCDs) are a type of display that is widely used currently due to their advantages of small size, low power consumption, no radiation, etc.

SUMMARY

In an aspect, a liquid crystal display panel is provided. The liquid crystal display panel includes: a first polarizer; a second polarizer disposed opposite to the first polarizer, a transmission axis of the first polarizer being perpendicular to a transmission axis of the second polarizer; a liquid crystal layer disposed between the first polarizer and the second polarizer, the liquid crystal layer including first liquid crystal molecules, and in a non-powered state of the liquid crystal display panel, orthographic projections of optical axes of the first liquid crystal molecules on the first polarizer being parallel to any of the transmission axis of the first polarizer and the transmission axis of the second polarizer; a first optical compensation layer disposed between the liquid crystal layer and any of the first polarizer and the second polarizer, an orthographic projection of an optical axis of the first optical compensation layer on the first polarizer being perpendicular to the orthographic projections of the optical axes of the first liquid crystal molecules on the first polarizer; and a second optical compensation layer disposed on a same side of the liquid crystal layer as the first optical compensation layer, an optical axis of the second optical compensation layer being perpendicular to a plane where the second optical compensation layer is located.

In some embodiments, the first optical compensation layer is a +A compensation film layer.

In some embodiments, an in-plane retardation of the first optical compensation layer is in a range of 90 nm to 230 nm, inclusive.

In some embodiments, an in-plane retardation of the first optical compensation layer is any one of 120 nm, 123 nm, 133 nm, 150 nm, 160 nm, 175 nm, 180 nm, 185 nm, 190 nm or 200 nm.

In some embodiments, the second optical compensation layer is a +C compensation film layer.

In some embodiments, a thickness direction retardation of the second optical compensation layer is in a range of −30 nm to −180 nm, inclusive.

In some embodiments, a thickness direction retardation of the second optical compensation layer is any one of −60 nm, −64 nm, −75 nm, −100 nm, −110 nm, −125 nm, −135 nm or −150 nm.

In some embodiments, the first optical compensation is an optical compensation film layer based on coated liquid crystal molecules or an optical compensation film layer based on a stretched polymer film.

In some embodiments, the second optical compensation layer is another optical compensation film layer based on coated liquid crystal molecules or another optical compensation film layer based on a stretched polymer film.

In some embodiments, the liquid crystal display panel further includes: a first base substrate disposed between the first polarizer and the liquid crystal layer; a second base substrate disposed between the second polarizer and the liquid crystal layer; and a third optical compensation layer disposed between the first base substrate and the liquid crystal layer, or between the second base substrate and the liquid crystal layer. An orthographic projection of an optical axis of the third optical compensation layer on the first base substrate is parallel to orthographic projections of optical axes of the first liquid crystal molecules in the liquid crystal layer on the first base substrate.

In some embodiments, the third optical compensation layer is a +A compensation film layer.

In some embodiments, the first optical compensation layer is disposed on a side of the first base substrate away from the liquid crystal layer or on a side of the second base substrate away from the liquid crystal layer.

In some embodiments, the second optical compensation layer is disposed on a side of the first optical compensation layer away from the liquid crystal layer; or the second optical compensation layer is disposed between the first base substrate and the second base substrate; or the second optical compensation layer is disposed between the first base substrate and the first optical compensation layer; or the second optical compensation layer is disposed between the second base substrate and the first optical compensation layer.

In some embodiments, a sum of an in-plane retardation of the third optical compensation layer and an in-plane retardation of the liquid crystal layer is equal to a positive integer multiple of a first wavelength. The first wavelength is in a range of a difference between 535 nm and 50 nm to a sum of 535 nm and 50 nm.

In some embodiments, the in-plane retardation of the third optical compensation layer is in a range of 160 nm to 240 nm, and the in-plane retardation of the liquid crystal layer is in a range of a difference between 350 nm and 25 nm to a sum of 350 nm and 25 nm.

In some embodiments, the in-plane retardation of the third optical compensation layer is in a range of a difference between 185 nm and 25 nm to a sum of 185 nm and 25 nm, and the in-plane retardation of the liquid crystal layer is in a range of a difference between 350 nm and 25 nm to a sum of 350 nm and 25 nm.

In some embodiments, the first polarizer, the first base substrate, the liquid crystal layer, the third optical compensation layer, the second base substrate, the first optical compensation layer, the second optical compensation layer and the second polarizer are arranged in sequence; or the first polarizer, the first base substrate, the third optical compensation layer, the liquid crystal layer, the second base substrate, the first optical compensation layer, the second optical compensation layer and the second polarizer are arranged in sequence; or the first polarizer, the first base substrate, the liquid crystal layer, the second optical compensation layer, the third optical compensation layer, the second base substrate, the first optical compensation layer and the second polarizer are arranged in sequence.

In some embodiments, the first optical compensation layer is disposed between the first base substrate and the second base substrate.

In some embodiments, the second optical compensation layer is disposed between the first base substrate and the second base substrate; or the second optical compensation layer is disposed on a side of the first base substrate away from the liquid crystal layer or on a side of the second base substrate away from the liquid crystal layer.

In some embodiments, an in-plane retardation of the first optical compensation layer is $R_{O1}$, an in-plane retardation of the third optical compensation layer is $R_{O2}$, an in-plane retardation of the liquid crystal layer is $R_{OLC}$, $R_1$, $R_2$ and $R_{LC}$ satisfy a following formula: $R_{O2}-R_{O1}+R_{OLC}=n\lambda$; where n is an integer, $\lambda$ is a first wavelength, and the first wavelength is in a range of a difference between 535 nm and 50 nm to a sum of 535 nm and 50 nm.

In some embodiments, the liquid crystal layer includes a first alignment film and a second alignment film that are disposed opposite to each other, and a first liquid crystal molecular layer located between the first alignment film and the second alignment film. The first alignment film is configured to anchor a part of first liquid crystal molecules proximate to the first alignment film in the first liquid crystal molecular layer, so that the part of first liquid crystal molecules proximate to the first alignment film have a first pretilt angle. The second alignment film is configured to anchor another part of first liquid crystal molecules proximate to the second alignment film in the first liquid crystal molecular layer, so that the another part of first liquid crystal molecules proximate to the second alignment film have a second pretilt angle. An alignment direction of the first alignment film is the same as an alignment direction of the second alignment film. The third optical compensation layer includes a third alignment film and a second liquid crystal molecular layer. The third alignment film is configured to anchor a part of second liquid crystal molecules proximate to the third alignment film in the second liquid crystal molecular layer, so that the part of second liquid crystal molecules proximate to the third alignment film have a third pretilt angle. Orthographic projections of optical axes of second liquid crystal molecules in the second liquid crystal molecular layer on the first base substrate are parallel to orthographic projections of the optical axes of the first liquid crystal molecules in the first liquid crystal molecular layer on the first base substrate.

In some embodiments, a direction of the first pretilt angle is the same as a direction of the second pretilt angle, and a direction of the third pretilt angle is the same as or opposite to the direction of the first pretilt angle.

In some embodiments, a direction of the first pretilt angle is opposite to a direction of the second pretilt angle; and a direction of the third pretilt angle is the same as the direction of the first pretilt angle, or a direction of the third pretilt angle is the same as the direction of the second pretilt angle.

In some embodiments, the first pretilt angle, the second pretilt angle and the third pretilt angle are equal in magnitude.

In some embodiments, the first pretilt angle, the second pretilt angle and the third pretilt angle are in a range of a difference between 2° and 2° to a sum of 2° and 2°.

In some embodiments, the first pretilt angle, the second pretilt angle and the third pretilt angle are in a range of a difference between 2° and 1° to a sum of 2° and 1°.

In some embodiments, the first liquid crystal molecules are negative liquid crystal molecules.

In another aspect, a display apparatus is provided. The display apparatus includes: the liquid crystal display panel as described in any of the above embodiments; and a backlight module disposed on a side of the first polarizer of the liquid crystal display panel away from the liquid crystal layer of the liquid crystal display panel.

In some embodiments, the orthographic projections of the optical axes of the first liquid crystal molecules in the liquid crystal layer of the liquid crystal display panel on the first polarizer are perpendicular to the transmission axis of the first polarizer, and both the first optical compensation layer and the second optical compensation layer of the liquid crystal display panel are disposed on a side of the liquid crystal layer away from the backlight module.

In some embodiments, the orthographic projections of the optical axes of the first liquid crystal molecules in the liquid crystal layer of the liquid crystal display panel on the first polarizer are parallel to the transmission axis of the first polarizer; and both the first optical compensation layer and the second optical compensation layer of the liquid crystal display panel are disposed on a side of the liquid crystal layer proximate to the backlight module.

In yet another aspect, a method for manufacturing a liquid crystal display panel is provided. The method includes: providing a first polarizer and a second polarizer, a transmission axis of the first polarizer being perpendicular to a transmission axis of the second polarizer; forming a liquid crystal layer between the first polarizer and the second polarizer, the liquid crystal layer including first liquid crystal molecules, and orthographic projections of optical axes of the first liquid crystal molecules on the first polarizer being parallel to any of the transmission axis of the first polarizer and the transmission axis of the second polarizer; forming a first optical compensation layer between the liquid crystal layer and any of the first polarizer and the second polarizer, an orthographic projection of an optical axis of the first optical compensation layer on the first polarizer being perpendicular to the orthographic projections of the optical axes of the first liquid crystal molecules on the first polarizer; and forming a second optical compensation layer on a side, where the first optical compensation layer is located, of the liquid crystal layer, an optical axis of the second optical compensation layer being perpendicular to a plane where the second optical compensation layer is located.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
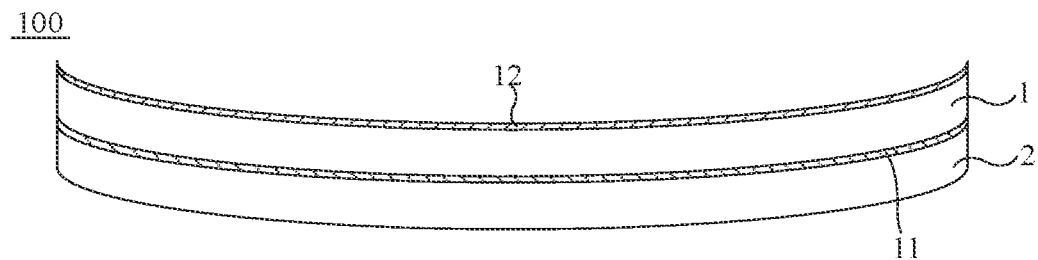
FIG. 1 is a diagram showing a structure of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined by "first" or "second" may explicitly or implicitly include one or more of the features. In the description of the embodiments of the present disclosure, the term "a plurality of" or "the plurality of" means two or more unless otherwise specified.

The phrase "A and/or B" includes the following three combinations: only A, only B, and a combination of A and B.

As used herein, depending on the context, the term "if" is optionally construed as "When" or "in a case where" or "in response to determining that" or "in response to detecting". Similarly, depending on the context, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]".

The use of the phrase "applicable to" or "configured to" herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As used herein, terms such as "parallel", "perpendicular" and "equal" include a stated condition and a condition similar to the stated condition. A range of the similar condition is within an acceptable range of deviation. The acceptable range of deviation is determined by a person of ordinary skill in the art in view of measurement in question and errors associated with measurement of a particular quantity (i.e., limitations of a measurement system). For example, the term "parallel" includes absolute parallelism and approximate parallelism, and an acceptable range of deviation of approximate parallelism may be, for example, a deviation within 5°. The term "perpendicular" includes absolute perpendicularity and approximate perpendicularity, and an acceptable range of deviation of approximate perpendicularity may also be, for example, a deviation within 5°. The term "equal" includes absolute equality and approximate equality, and an acceptable range of deviation of approximate equality may be, for example, such that a difference between the two that are equal to each other is less than or equal to 5% of either.

Exemplary embodiments are described herein with reference to cross-sectional views and/or plan views as idealized exemplary drawings. In the accompanying drawings, thicknesses of layers and sizes of regions may be exaggerated for clarity. Variations in shapes relative to the accompanying drawings due to, for example, manufacturing technologies and/or tolerances may be envisaged. Therefore, the exemplary embodiments should not be construed as being limited to the shapes of the regions shown herein, but including deviations in shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

Moreover, the liquid crystal display panels shown in the exemplary drawings herein are in a non-powered state. It will be understood that, after a voltage is applied to the liquid crystal display panel, at least part of liquid crystal molecules in the liquid crystal display panel will be deflected, thereby realizing an image display function.

Referring to FIG. 1, some embodiments of the present disclosure provide a display apparatus 100. For example, the display apparatus 100 may be a display apparatus using an advanced super dimension switch (ADS) mode.

For example, the display apparatus 100 may be any apparatus that displays images whether in motion (e.g., a video) or stationary (e.g., a still image), and regardless of text or image. The display apparatus 100 may be any of a variety of display apparatuses 100, which include but are not limited to mobile phones, wireless apparatuses, personal digital assistants (PDAs), hand-held or portable computers, global positioning system (GPS) receivers/navigators, cameras, MPEG-4 Part 14 (MP4) video players, video cameras, game consoles, panel displays, computer monitors, vehicle displays (e.g., tachographs or reverse images of a vehicle), etc.

With continued reference to FIG. 1, the display apparatus 100 may include, for example, a liquid crystal display panel 1 and a backlight module 2. The backlight module 2 may provide the liquid crystal display panel 1 with a light source for display.

Figure 2A:
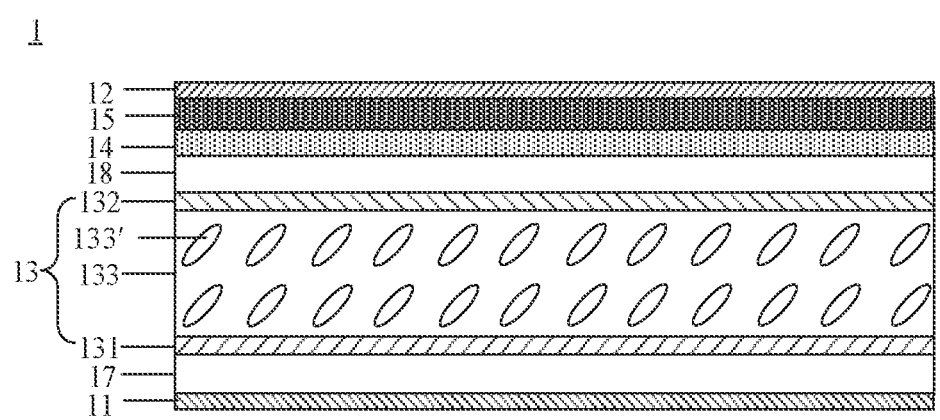
FIG. 2A is a diagram showing a structure of a liquid crystal display panel, in accordance with some embodiments.
Figure 2B:
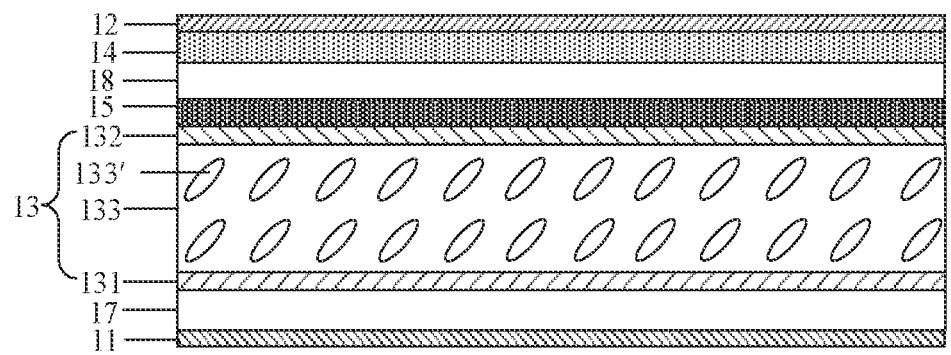
FIG. 2B is a diagram showing a structure of another liquid crystal display panel, in accordance with some embodiments.
Figure 2C:
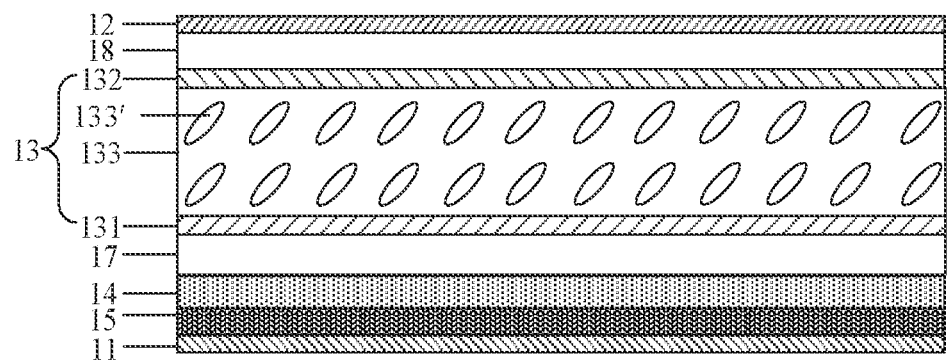
FIG. 2C is a diagram showing a structure of yet another liquid crystal display panel, in accordance with some embodiments.

Referring to FIGS. 2A to 2C, some embodiments of the present disclosure provide a liquid crystal display panel 1, and the liquid crystal display panel 1 includes a first polarizer 11, a second polarizer 12 disposed opposite to the first polarizer 11, and a liquid crystal layer 13 disposed between the first polarizer 11 and the second polarizer 12. A transmission axis of the first polarizer 11 is perpendicular to a transmission axis of the second polarizer 12.

Positions of the first polarizer 11 and the second polarizer 12 may be set according to actual needs, and are not limited in the embodiments of the present disclosure. For convenience of description, in some embodiments of the present disclosure, the first polarizer 11 is located on a side of the liquid crystal layer 13 facing the backlight module, and the second polarizer 12 is located on a side of the liquid crystal layer 13 away from the backlight module. On this basis, the first polarizer 11 is configured to make light emitted from the backlight module 2 be linearly polarized light, and the second polarizer 12 is configured to make light having a polarization direction perpendicular to the transmission axis of the second polarizer 12 not exit.

The liquid crystal layer 13 includes first liquid crystal molecules 133', and in a non-powered state of the liquid crystal display panel, orthographic projections of optical axes of the first liquid crystal molecules 133' on the first polarizer 11 are parallel to the transmission axis of the first polarizer 11 or the transmission axis of the second polarizer 12. That is, in some embodiments, the orthographic projections of the optical axes of the first liquid crystal molecules 133' on the first polarizer 11 are parallel to the transmission axis of the first polarizer 11; accordingly, the orthographic projections of the optical axes of the first liquid crystal molecules 133' on the first polarizer 11 are perpendicular to the transmission axis of the second polarizer 12. In some other embodiments, the orthographic projections of the optical axes of the first liquid crystal molecules 133' on the first polarizer 11 are parallel to the transmission axis of the second polarizer 12; accordingly, the orthographic projections of the optical axes of the first liquid crystal molecules 133' on the first polarizer 11 are perpendicular to the transmission axis of the first polarizer 11.

On this basis, with continued reference to FIGS. 2A to 2C, the liquid crystal display panel 1 further includes a first optical compensation layer 14 and a second optical compensation layer 15.

An orthographic projection of an optical axis of the first optical compensation layer 14 on the first polarizer 11 is perpendicular to the orthographic projections of the optical axes of the first liquid crystal molecules 133' in the liquid crystal layer 13 on the first polarizer 11. The first optical compensation layer 14 is disposed between the second polarizer 12 and the liquid crystal layer 13 (as shown in FIGS. 2A and 2B); or the first optical compensation layer 14 is disposed between the first polarizer 11 and the liquid crystal layer 13 (as shown in FIG. 2C).

An optical axis of the second optical compensation layer 15 is perpendicular to a plane where the second optical compensation layer 15 is located. The second optical compensation layer 15 is disposed between the first optical compensation layer 14 and the liquid crystal layer 13 (as shown in FIG. 2B); or the second optical compensation layer 15 is disposed on a side of the first optical compensation layer 14 away from the liquid crystal layer 13 (as shown in FIGS. 2A and 2C).

It will be noted that, an optical axis (e.g., the optical axis of the first optical compensation layer 14, the optical axis of the second optical compensation layer 15, or an optical axis of a first liquid crystal molecule 133') is also referred to as an optic axis. When light travels in a crystal, a direction in which two orthogonal waves travel at the same speed is an extending direction of the optical axis, and there is no change in optical properties of light in this direction. For example, an anisotropic crystal has a birefringent effect on light traveling therein, but when the light travels therein along an optical axis of the anisotropic crystal, the light does not undergo birefringence. Therefore, a extension direction of the optical axis of the anisotropic crystal may also be defined as a direction in which light can travel without birefringence.

In addition, anisotropic crystals may be classified into uniaxial crystals and biaxial crystals. The uniaxial crystal has only a single optical axis, and the biaxial crystal has two optical axes.

Liquid crystal molecules belong to uniaxial crystals and have only a single optical axis. Liquid crystal molecules may be classified into rod-like liquid crystal molecules and discotic liquid crystal molecules according to their shapes. In a rod-like liquid crystal molecule, a long axis thereof is the optical axis. In a discotic liquid crystal molecule, a short axis thereof is the optical axis. In some embodiments, the first liquid crystal molecules 133' in the liquid crystal layer 13 are all rod-like liquid crystal molecules.

In some embodiments, the liquid crystal layer 13 includes a first alignment film 131 and a second alignment film 132 that are arranged opposite to each other, and a first liquid crystal molecular layer 133 located between the first alignment film 131 and the second alignment film 132. The first liquid crystal molecules 133' are located in the first liquid crystal molecular layer 133.

The first alignment film 131 is configured to anchor a part of first liquid crystal molecules 133' proximate to the first alignment film 131 in the first liquid crystal molecular layer 133, so that the part of first liquid crystal molecules 133' proximate to the first alignment film 131 have a first pretilt angle.

The second alignment film 132 is configured to anchor another part of first liquid crystal molecules 133' proximate to the second alignment film 132 in the first liquid crystal molecular layer 133, so that the another part of first liquid crystal molecules 133' proximate to the second alignment film 132 have a second pretilt angle.

An alignment direction of the first alignment film 131 is the same as an alignment direction of the second alignment film 132.

A pretilt angle may cause liquid crystal molecules to be in a pretilt state, and the pretilt state means that the liquid crystal molecules proximate to an alignment film are tilted in a specific direction relative to a plane where the alignment film is located. In some embodiments of the present disclosure, the long axis of the rod-like liquid crystal molecule intersects the plane where the alignment film is located, and the pretilt angle refers to an included angle between the long axis of the rod-like liquid crystal molecule and an alignment direction of the alignment film. The pretilt angles presented by the first liquid crystal molecules 133' are included angles between the long axes of the first liquid crystal molecules 133' proximate to the first alignment film 131 and the alignment direction of the first alignment film 131 (i.e., the first pretilt angles) and included angles between the long axes of the first liquid crystal molecules 133' proximate to the second alignment film 132 and the alignment direction of the second alignment film 132 (i.e., the second pretilt angles) in states presented by the first liquid crystal molecules 133' when the liquid crystal display panel 1 is not powered or a voltage between a pixel electrode and a common electrode is 0.

The first optical compensation layer 14 includes an anisotropic crystal layer having at least one optical axis. In some embodiments, the first optical compensation layer 14 is a uniaxial optical compensation layer having only a single optical axis. On this basis, for example, the first optical compensation layer 14 is a +A compensation film layer. The +A compensation film layer satisfies a condition that $n_{x1}$ is greater than $n_{y1}$ and $n_{y1}$ is approximately equal to $n_{z1}$ (i.e., $n_{x1} > n_{y1} \approx n_{z1}$) or $n_{x1}$ is greater than $n_{y1}$ and $n_{y1}$ is equal to $n_{z1}$ (i.e., $n_{x1} > n_{y1} = n_{z1}$), where $n_{x1}$ is a refractive index of the +A compensation film layer in a direction of $X_1$ axis in a plane where the +A compensation film layer is located $n_{y1}$ is a refractive index of the +A compensation film layer in a direction of $Y_1$ axis that is perpendicular to the $X_1$ axis in the plane thereof, and $n_{z1}$ is a refractive index of the +A compensation film layer in a thickness direction where the +A compensation film layer is located. The $X_1$ axis is the optical axis of the first optical compensation layer 14. It will be noted that, in a case where there is a small tilt angle (e.g., a tilt angle within 5°) between the $X_1$ axis and the +A compensation film layer, the $X_1$ axis may be considered to be in a plane where the +A compensation film layer is located. It will be understood that, in a case where there is a small tilt angle between the $X_1$ axis and the +A compensation film layer, there may be a certain difference between $n_{y1}$ and $n_{z1}$. Considering the above situation, $n_{y1}$ may be equal to or approximately equal to $n_{z1}$.

The second optical compensation layer 15 also includes an anisotropic crystal layer having at least one optical axis. In some embodiments, the second optical compensation layer 15 is a uniaxial optical compensation layer having only a single optical axis. On this basis, for example, the second optical compensation layer 15 is a +C compensation film layer. The +C compensation film layer satisfies a condition that $n_{z2}$ is greater than $n_{x2}$ and $n_{x2}$ is equal to $n_{y2}$ (i.e., $n_{z2} > n_{x2} = n_{y2}$), where $n_{z2}$ is a refractive index of the +C compensation film layer in a thickness direction thereof, $n_{x2}$ is a refractive index of the +C compensation film layer in a direction of $X_2$ axis in a plane where the +C compensation film layer is located, and $n_{y2}$ is a refractive index of the +C compensation film layer in a direction of $Y_2$ axis that is perpendicular to the $X_2$ axis in the plane where the +C compensation film layer is located.

Figure 3A:
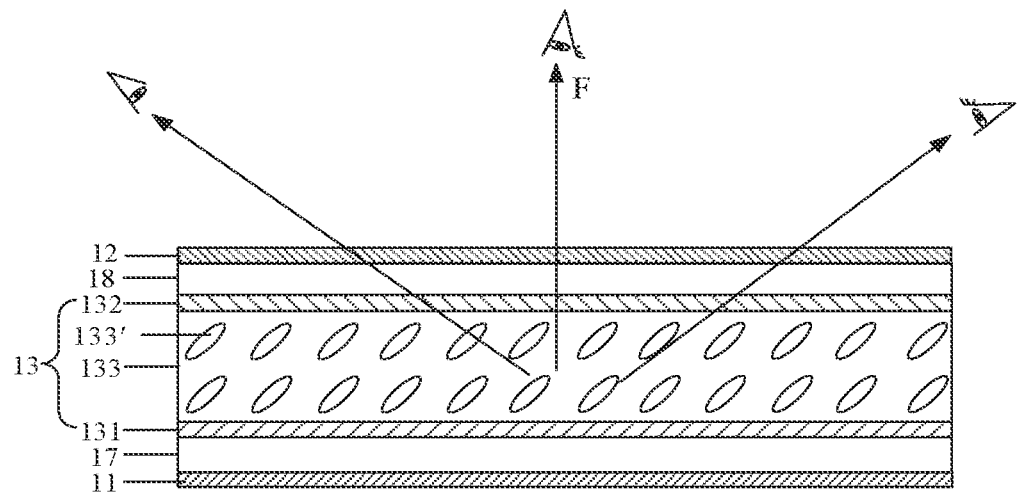
FIG. 3A is a schematic diagram showing a structure of a liquid crystal display panel in the related art.

Referring to FIG. 3A, a liquid crystal display panel 01 in the related art has a light leakage problem in an L0 state. The L0 state refers to a state in which the liquid crystal display panel 01 is not powered and is in a dark state, while the backlight module provides a light source normally. On one aspect, the liquid crystal display panel 01 includes a first polarizer 11 and a second polarizer 12. The first polarizer 11 is located on a side of the liquid crystal display panel 01 facing the backlight module, the second polarizer 12 is located on a side of the liquid crystal display panel 01 away from the backlight module, and a transmission axis of the first polarizer 11 is perpendicular to a transmission axis of the second polarizer 12. The first polarizer 11 is configured to make light emitted from a backlight module be linearly polarized light, and the second polarizer 12 is configured to make light having a polarization direction perpendicular to the transmission axis of the second polarizer 12 not exit. When viewed from a normal direction of a light exit surface of the liquid crystal display panel 01, the transmission axis of the first polarizer 11 and the transmission axis of the second polarizer 12 are orthogonal to each other. However, when viewed from a direction (a side viewing angle) away from the normal direction of the light exit surface of the liquid crystal display panel 01, the transmission axis of the first polarizer 11 and the transmission axis of the second polarizer 12 are non-orthogonal.

Figure 4A:
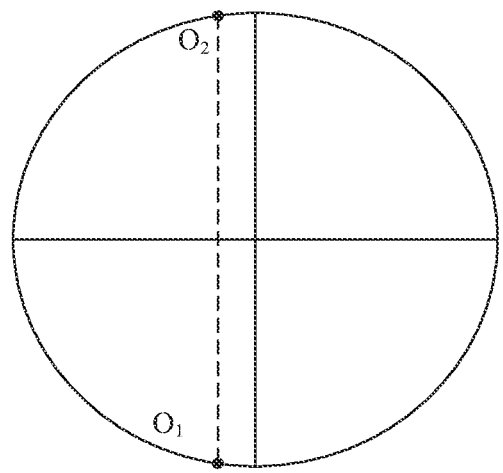
FIG. 4A is a diagram showing positions of a transmission axis of a first polarizer and a transmission axis of a second polarizer on a Poincaré sphere at a side viewing angle, in accordance with some embodiments.

In this way, a polarization direction of polarized light that enters the second polarizer 12 in an oblique direction is not orthogonal to the transmission axis of the second polarizer 12, and the polarized light will exit through the second polarizer 12, resulting in a phenomenon of light leakage at the side viewing angle. For example, FIG. 4A is a diagram showing positions of the transmission axis of the first polarizer and the transmission axis of the second polarizer on a Poincaré sphere at a side viewing angle, where $O_1$ is a position of the transmission axis of the first polarizer 11 at the side viewing angle, and $O_2$ is a position of the transmission axis of the second polarizer 12 at the side viewing angle. Obviously, a connection line between $O_2$ and $O_1$ does not pass through a center of the Poincaré sphere. Therefore, $O_2$ is not perpendicular to $O_1$, which will lead to the phenomenon of light leakage at the side viewing angle.

Figure 4B:
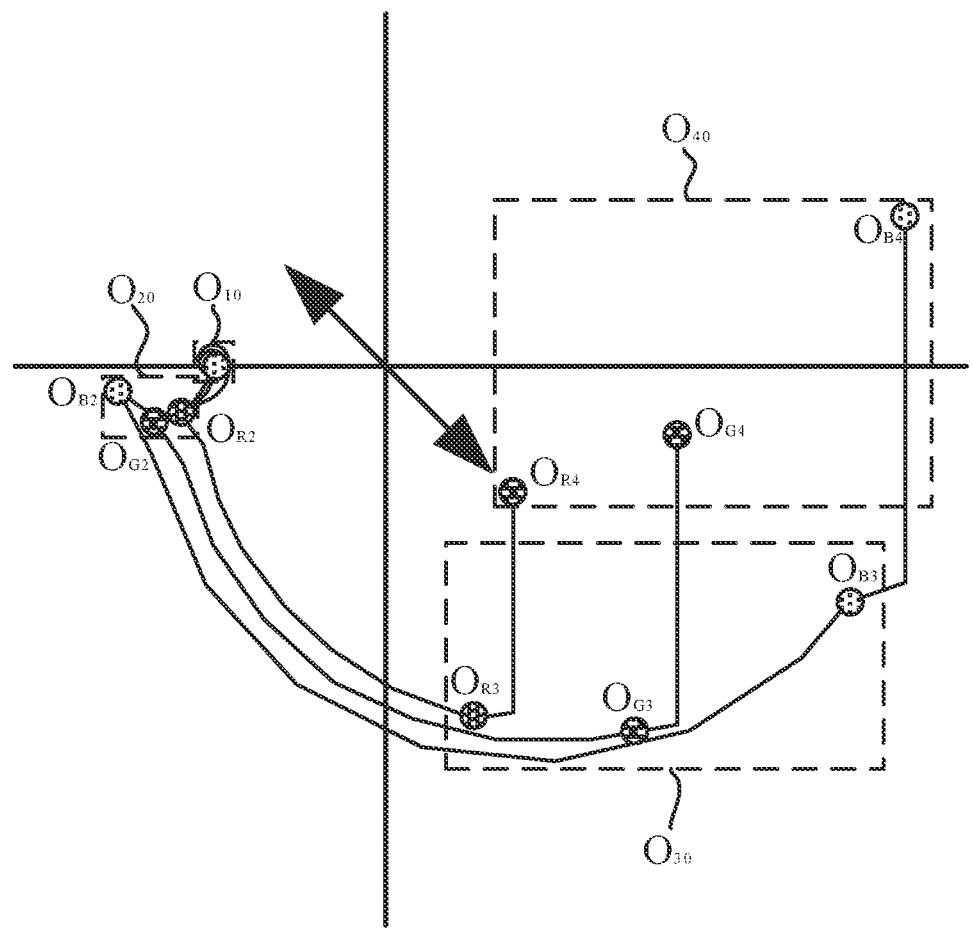
FIG. 4B is a diagram showing positions of polarization states of light passing through various layers in a liquid crystal display panel on a Poincaré sphere, in accordance with some embodiments.

On another aspect, since a liquid crystal layer 13 is an anisotropic fluid having both fluidity and birefringence properties of crystals, visible morphologies of a liquid crystal molecule are different at different viewing angles, and intensities of transmitted light observed at different viewing angles are also different, which shows a phenomenon of optical anisotropy. The smaller a viewing angle is, the smaller the optical anisotropy is; conversely, the larger the viewing angle is, the greater the optical anisotropy is. Referring to FIGS. 3A and 4B, as for linearly polarized light $O_{10}$ exiting from the first polarizer 11 and entering the liquid crystal layer 13 along the side viewing angle, due to an included angle between an incident direction thereof and the optical axis of the liquid crystal molecule, the linearly polarized light will undergo birefringence and be deflected to be elliptically polarized light $O_{20}$, and thus it may pass through the second polarizer 12, resulting in the phenomenon of light leakage at the side viewing angle. The phenomenon of light leakage at the side viewing angle is not obvious in a bright state, but is prominent in the dark state (L0 state). In addition, the phenomenon of light leakage at the side viewing angle in the dark state is significantly related to the viewing angle, and the larger the viewing angle is, the more serious the phenomenon of light leakage is.

In addition, the liquid crystal display panel 01 in the related art further has a color cast problem. Each pixel of the liquid crystal display panel is composed of a red sub-pixel, a green sub-pixel and a blue sub-pixel, and presents different colors by changing intensities of red light, green light and blue light. Since the liquid crystal molecules are made of a birefringent material, a birefringence (there are two light components along a long axis and along a short axis) phenomenon will be generated after light enters tilted liquid crystal molecules, which causes a difference in $\Delta n$ when the liquid crystal display panel 01 is viewed from different positions. As a result, there is a difference between the transmittance of light with different wavelength ranges, and transmission spectra of red light, green light and blue light change at different viewing angles, which finally lead to changes of the intensities of red light, green light and blue light at different viewing angles. The intensities of red light, green light and blue light designed according to a front viewing angle (i.e., the normal direction of the light exit surface of the liquid crystal display panel) will inevitably generate deviation at the side viewing angle, and there will naturally be a color deviation after the three colors of light are combined. Therefore, the liquid crystal display panel has a color cast problem at the side viewing angle.

For example, referring to FIG. 4B, for the elliptically polarized light $O_{20}$, blue light ($O_{B2}$) is closer to the linearly polarized light than red light ($O_{R2}$), and the red light ($O_{R2}$) is closer to the linearly polarized light than green light ($O_{G2}$). Thus, it is easier for red light and green light to pass through the second polarizer 12, and there is more red light and green light in leaked light, which presents a yellowish color cast phenomenon and is easily perceived by human eyes. Here, $\Delta n$ is a difference between a refractive index $n_e$ of extraordinary light and a refractive index $n_e$ of ordinary light, where the ordinary light is light that obeys the law of refraction, and the extraordinary light is light that does not obey the law of refraction. As for a positive liquid crystal molecule, the refractive index no of ordinary light corresponds to the short axis of the liquid crystal molecule no matter in which direction the light travels, and thus the refractive index $n_o$ of ordinary light is constant, while the refractive index $n_s$ of extraordinary light changes with a change of a direction in which the light travels, and corresponds to an optical axis direction of liquid crystal molecule.

Therefore, the liquid crystal display panel 01 in the related art has the light leakage problem in the L0 state and the color cast problem.

Figure 3B:
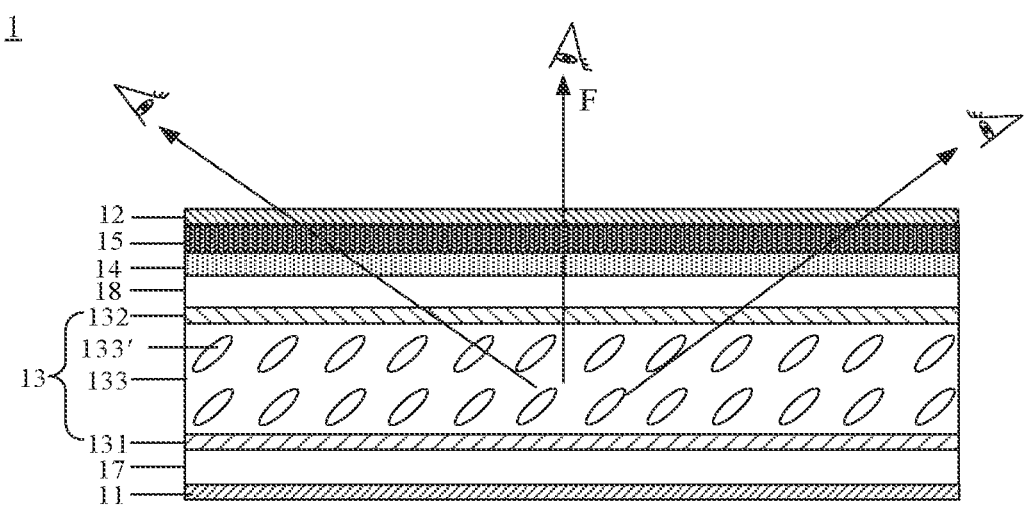
FIG. 3B is a diagram showing a structure of yet another liquid crystal display panel, in accordance with some embodiments.
Figure 4C:
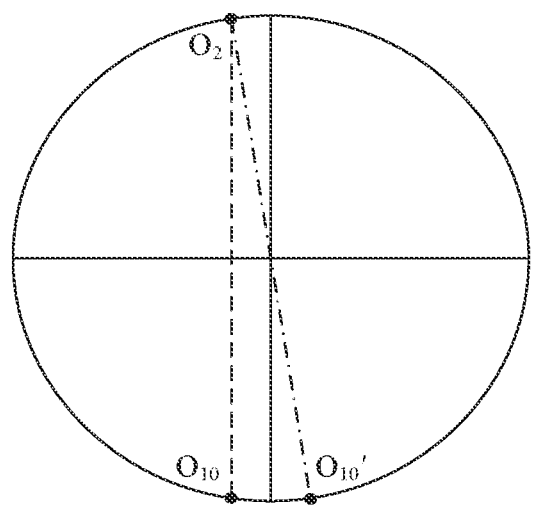
FIG. 4C is a diagram showing positions of side-view light after passing through a first polarizer and before reaching a second polarizer on a Poincaré sphere, in accordance with some embodiments.

Referring to FIGS. 3B, 4B and 4C, when the liquid crystal display panel 1 in some embodiments of the present disclosure is in the L0 state, the first optical compensation layer 14 and the second optical compensation layer 15 compensate for a phase retardation of polarized light passing therethrough at the side viewing angle to change a polarization state of the polarized light. On one aspect, a phase retardation effect of the liquid crystal layer 13 is offset, and the polarized light returns to a state of the linearly polarized light when entering the second polarizer 12 at the side viewing angle. On another aspect, the linearly polarized light is rotated to a state where the polarization direction of polarized light is perpendicular to the transmission axis of the second polarizer 12. Referring to FIG. 4C, after passing through the liquid crystal layer 13, the first optical compensation layer 14 and the second optical compensation layer 15, the linearly polarized light $O_{10}$ exiting from the first polarizer 11 and entering the liquid crystal layer 13 at the side viewing angle is deflected to be linearly polarized light $O_{10'}$, a polarization direction of which is perpendicular to a transmission axis $O_2$ of the second polarizer 12 at a side viewing angle, and cannot pass through the second polarizer 12. Thus, most of light entering the second polarizer 12 at the side viewing angle cannot exit from the second polarizer 12, so that the light leakage problem at the side viewing angle may be effectively reduced. In addition, referring to FIG. 4B, the first optical compensation layer 14 and the second optical compensation layer 15 may offset the phase retardation caused by the liquid crystal layer 13, which may reduce changes of the transmission spectra of red light, green light and blue light at different viewing angles, and further reduce changes in the intensities of the three colors of light at different viewing angles. Therefore, color deviation after the three colors of light are combined at the side viewing angle may be reduced, and the color cast problem may be solved.

It will be noted that color cast is a phenomenon that occurs when the liquid crystal display panel is viewed from any side (at a side viewing angle) of the liquid crystal display panel in the L0 state, and the color cast is essentially caused by the light leakage. Therefore, the liquid crystal display panel 1 provided by some embodiments of the present disclosure may reduce the luminance corresponding to the color cast while reducing the luminance of the light leakage, thereby improving the display effect of the liquid crystal display panel 1.

In some embodiments, an in-plane retardation $R_{O1}$ of the first optical compensation layer 14 is in a range of 90 nm to 230 nm, inclusive. In some examples, the in-plane retardation $R_{O1}$ of the first optical compensation layer 14 is in a range of 120 nm to 200 nm. In some examples, the in-plane retardation $R_{O1}$ of the first optical compensation layer 14 is in a range of 150 nm to 185 nm. For example, the in-plane retardation $R_{O1}$ of the first optical compensation layer 14 is any one of 120 nm, 123 nm, 133 nm, 150 nm, 160 nm, 175 nm, 180 nm, 185 nm, 190 nm or 200 nm. Here, the in-plane retardation $R_{O1}$ of the first optical compensation layer 14 is equal to a product of $d_1$ and a difference of $n_{z1}$ and $n_{y1}$ (i.e., $R_{O1}=(n_{x1}-n_{y1})\times d_1$), where $n_{x1}$ is a refractive index of the first optical compensation layer 14 in a direction of $X_1$ axis in a plane where the first optical compensation layer 14 is located, $n_{y1}$ is a refractive index of the first optical compensation layer 14 in a direction of $Y_1$ axis that is perpendicular to the $X_1$ axis in the plane where the first optical compensation layer 14 is located, and $d_1$ is a thickness of the first optical compensation layer 14. It will be noted that $R_{O1}$ is the in-plane retardation of the first optical compensation layer 14, and may be understood as an actual retardation of light passing through the first optical compensation layer 14 in the normal direction (a vertical direction).

In some embodiments, a thickness direction retardation $R_t$ of the second optical compensation layer 15 is in a range of −30 nm to −180 nm, inclusive. In some examples, the thickness direction retardation $R_h$ of the second optical compensation layer 15 is in a range of −75 nm to −150 nm. In some examples, the thickness direction retardation $R_h$ of the second optical compensation layer 15 is in a range of −100 nm to −125 nm. For example, the thickness direction retardation $R_h$ of the second optical compensation layer 15 is any one of −60 nm, −64 nm, −75 nm, −100 nm, −110 nm, −125 nm, −135 nm or −150 nm. Here, the thickness direction retardation $R_h$ of the second optical compensation layer 15 is equal to a product of $d_2$ and a difference of a half of $n_{x2}$ and $n_{y2}$ and $n_{z2}$ (i.e., $R_{th}=[(nx_2+n_{y2})/2-n_2]\times d_2$), where $n_{x2}$ is a refractive index of the second optical compensation layer 15 in a direction of $X_2$ axis in a plane where the second optical compensation layer 15 is located, $n_{y2}$ is a refractive index of the second optical compensation layer 15 in a direction of $Y_2$ axis that is perpendicular to the $X_2$ axis in the plane where the second optical compensation layer 15 is located, $n_{z2}$ is a refractive index of the second optical compensation layer 15 in a thickness direction thereof, and $d_2$ is a thickness of the second optical compensation layer 15.

By controlling the in-plane retardation $R_{O1}$ of the first optical compensation layer 14 and the thickness direction retardation $R_{th}$ of the second optical compensation layer 15, it is possible to obtain a required compensation effect to ensure polarized light incident on the second polarizer 12 at the side viewing angle to be linearly polarized light, the polarization direction of which is perpendicular to the transmission axis of the second polarizer 12, so as to reduce the light leakage at the side viewing angle; in addition, it is possible to focus on controlling phase retardations of red light and green light to ensure red light and green light incident on the second polarizer 12 at the side viewing angle to be linearly polarized light, the polarization direction of which is perpendicular to the transmission axis of the second polarizer 12, so that most of the red light and the green light incident on the second polarizer 12 at the side viewing angle cannot pass through the second polarizer 12, and transmittances of the red light and the green light are reduced. As a result, the light leakage appears bluish-purple when the liquid crystal display panel is viewed at the side viewing angle, and an influence of yellowish color cast may be reduced.

Referring to FIGS. 3B and 4B, after passing through the liquid crystal layer 13, the linearly polarized light $O_{10}$ exiting from the first polarizer 11 is deflected to be the elliptically polarized light $O_{20}$. For the elliptically polarized light $O_{20}$, blue light ($O_2$) is closer to the linearly polarized light than red light ($O_{R2}$), and red light ($O_{R2}$) is closer to the linearly polarized light than green light ($O_{G2}$). Therefore, the light leakage is biased to yellow and shows a yellowish phenomenon. Referring to FIG. 3B, considering an example in which the first optical compensation layer 14 and the second optical compensation layer 15 are located on the side of the liquid crystal layer 13 away from the first polarizer 11 for description, the elliptically polarized light $O_{20}$ is deflected to be elliptically polarized light $O_{30}$ after passing through the first optical compensation layer 14, and the elliptically polarized light $O_{30}$ is deflected to be linearly polarized light $O_{40}$ after passing through the second optical compensation layer 15. For the linearly polarized light $O_{40}$, green light ($O_{G4}$) is closer to the linearly polarized light than red light ($O_{R4}$), and red light ($O_{R4}$) is closer to the linearly polarized light than blue light ($O_{B4}$). In this way, most of the red light and the green light cannot exit from the second polarizer 12, so that the light leakage when the liquid crystal display panel is viewed from the side viewing angle is bluish-purple, and the influence of yellowish color cast may be reduced. For example, in the liquid crystal display panel 1 corresponding to FIG. 4B, the in-plane retardation $R_{O1}$ of the first optical compensation layer 14 is 150 nm, and the thickness direction retardation $R_t$ of the second optical compensation layer 15 is −100 nm.

The type of the first optical compensation layer 14 is determined according to actual use requirements and/or process requirements, and is not limited in the embodiments of the present disclosure. In some embodiments, the first optical compensation layer 14 is an optical compensation film layer based on coated liquid crystal molecules. In some other embodiments, the first optical compensation layer 14 is an optical compensation film layer based on a stretched polymer film.

The type of the second optical compensation layer 15 is determined according to actual use requirements and/or process requirements, and is not limited in the embodiments of the present disclosure. In some embodiments, the second optical compensation layer 15 is an optical compensation film layer based on a stretched polymer film. In some other embodiments, the second optical compensation layer 15 is an optical compensation film layer based on coated liquid crystal molecules.

The polymer film before being stretched may be fabricated by solution casting or melt extrusion or any other film-forming technique known in the art, and may include a polystyrene film, a polynorbornene film, etc. In some examples, the polymer film before being stretched is a non-liquid crystal polymer film. When the first optical compensation layer 14 or the second optical compensation layer 15 is manufactured, the polymer film is stretched to obtain a desired optical compensation film layer.

Figure 5:
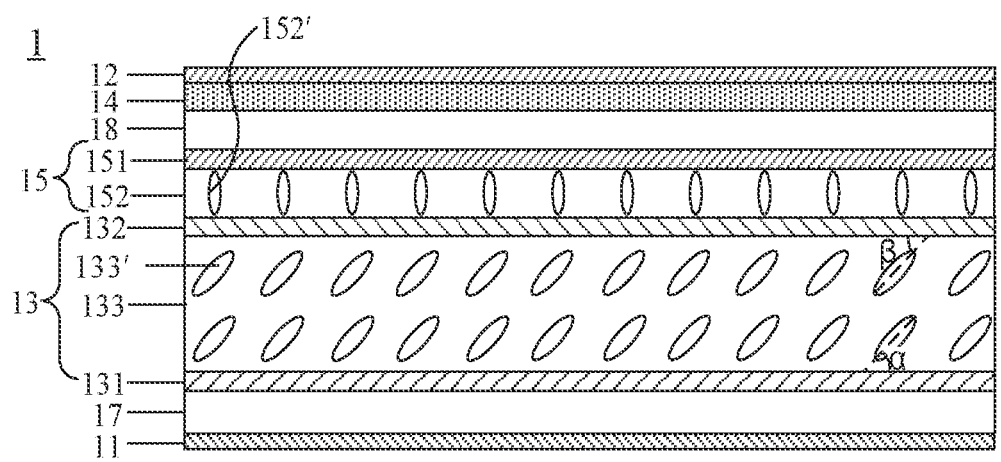
FIG. 5 is a diagram showing a structure of yet another liquid crystal display panel, in accordance with some embodiments.

Referring to FIG. 5, in some examples, the second optical compensation layer 15 includes a fourth alignment film 151 and a third liquid crystal molecular layer 152. The fourth alignment film 151 is configured to anchor third liquid crystal molecules 152' proximate to the fourth alignment film 151 in the third liquid crystal molecule layer 152, so that long axes of the third liquid crystal molecules 152' proximate to the fourth alignment film 151 are perpendicular to a plane where the fourth alignment film 151 is located.

Referring to FIGS. 2A to 2C, in some embodiments, the liquid crystal display panel 1 further includes a first base substrate 17 and a second base substrate 18. The first base substrate 17 is disposed between the first polarizer 11 and the liquid crystal layer 13, and the second base substrate 18 is disposed between the second polarizer 12 and the liquid crystal layer 13. The first base substrate 17 and the second base substrate 18 may be made of the same material, e.g., glass, or may, of course, be made of different materials, which is not limited in the embodiments of the present disclosure. In some examples, the first base substrate 17 is a base substrate in an array substrate; correspondingly, the second base substrate 18 is a base substrate in an opposite substrate (e.g., a color filter substrate). In some other examples, the first base substrate 17 is a base substrate in an opposite substrate (e.g., a color filter substrate); correspondingly, the second base substrate 18 is a base substrate in an array substrate.

Figure 6A:
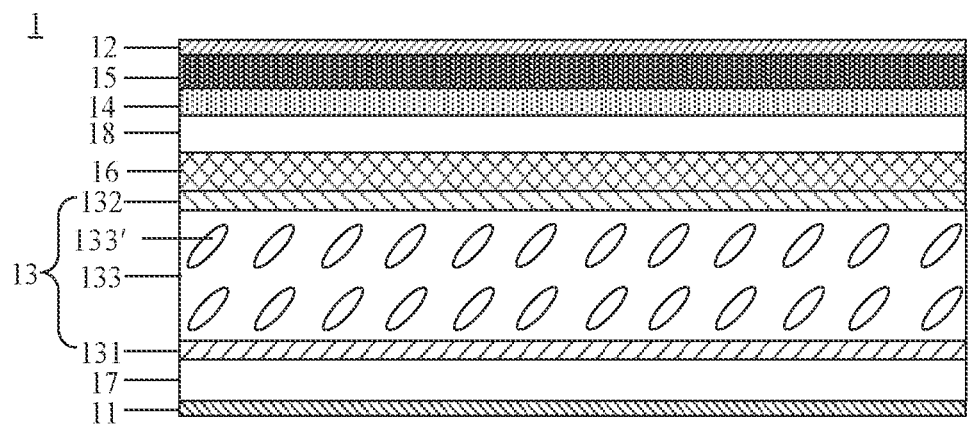
FIG. 6A is a diagram showing a structure of yet another liquid crystal display panel, in accordance with some embodiments.
Figure 6B:
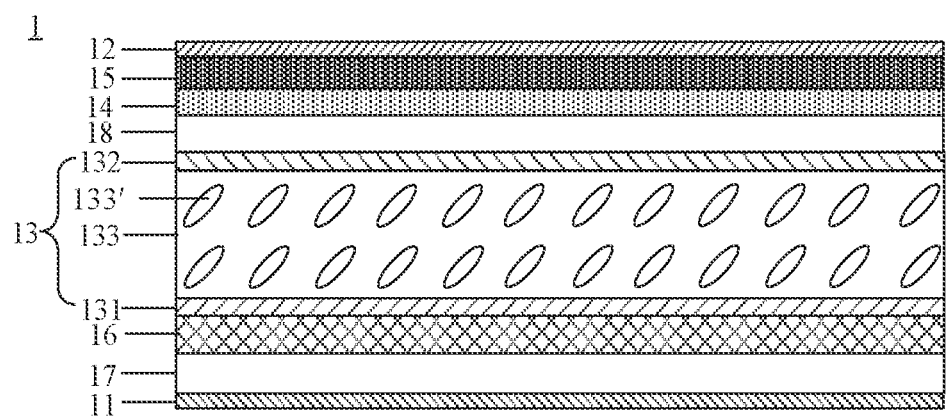
FIG. 6B is a diagram showing a structure of yet another liquid crystal display panel, in accordance with some embodiments.
Figure 6C:
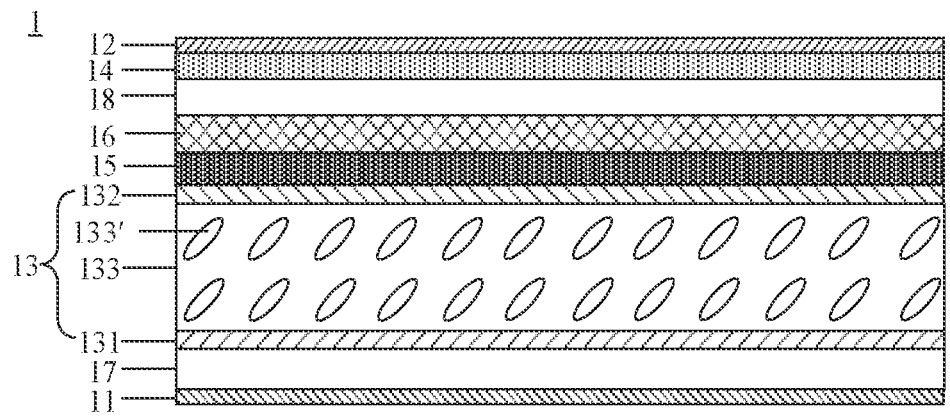
FIG. 6C is a diagram showing a structure of yet another liquid crystal display panel, in accordance with some embodiments.
Figure 6D:
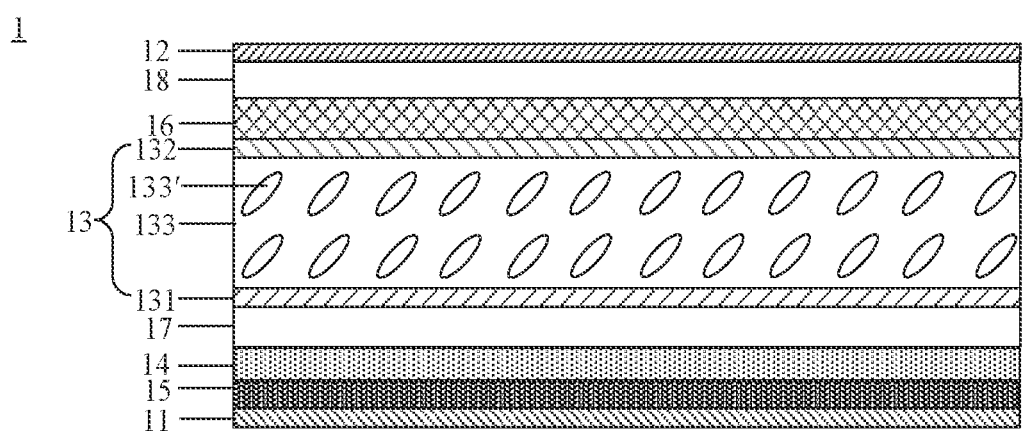
FIG. 6D is a diagram showing a structure of yet another liquid crystal display panel, in accordance with some embodiments.
Figure 6E:
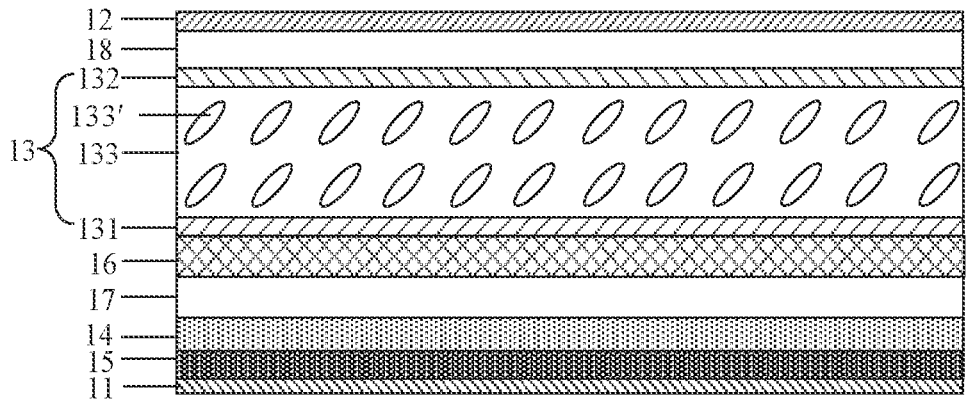
FIG. 6E is a diagram showing a structure of yet another liquid crystal display panel, in accordance with some embodiments.
Figure 6F:
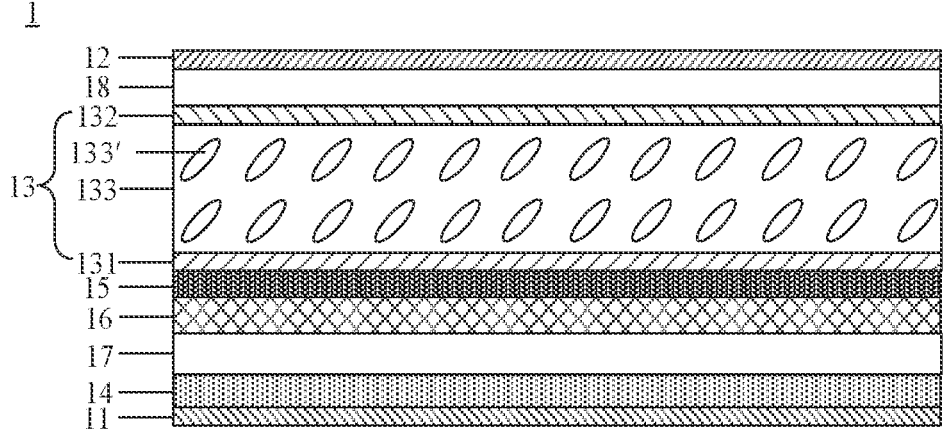
FIG. 6F is a diagram showing a structure of yet another liquid crystal display panel, in accordance with some embodiments.
Figure 6G:
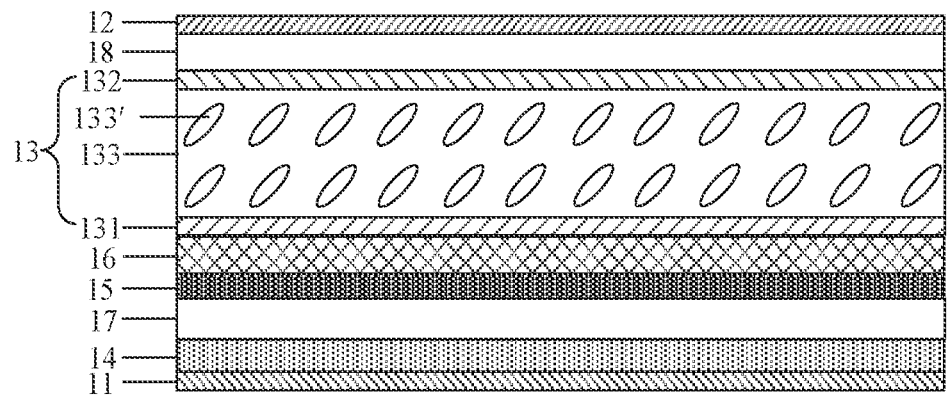
FIG. 6G is a diagram showing a structure of yet another liquid crystal display panel, in accordance with some embodiments.
Figure 6H:
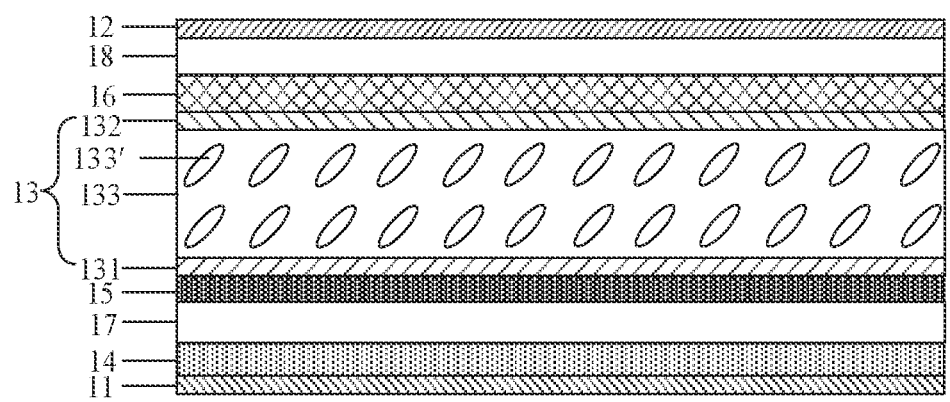
FIG. 6H is a diagram showing a structure of yet another liquid crystal display panel, in accordance with some embodiments.
Figure 6I:
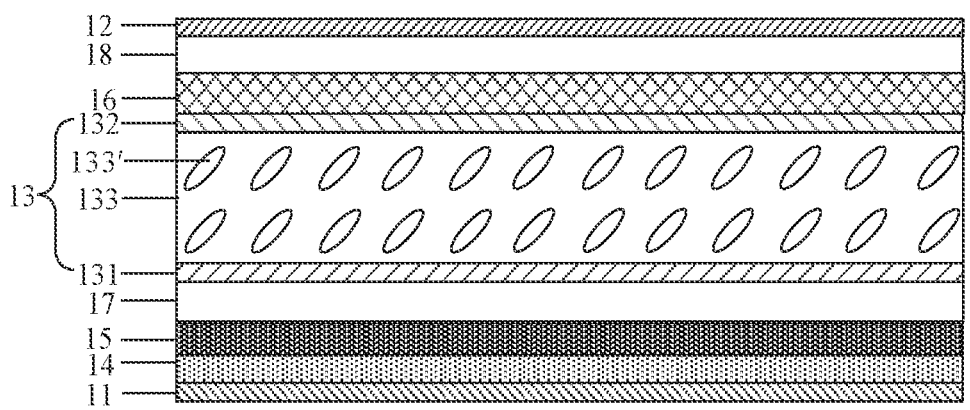
FIG. 6I is a diagram showing a structure of yet another liquid crystal display panel, in accordance with some embodiments.
Figure 6J:
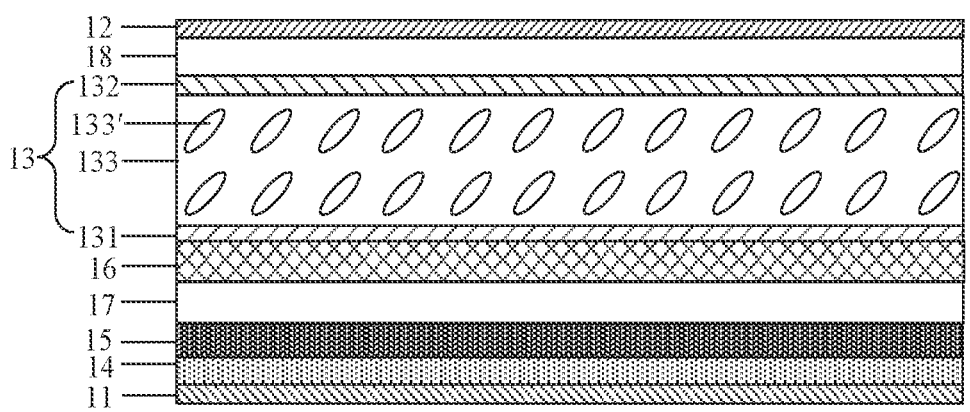
FIG. 6J is a diagram showing a structure of yet another liquid crystal display panel, in accordance with some embodiments.
Figure 6K:
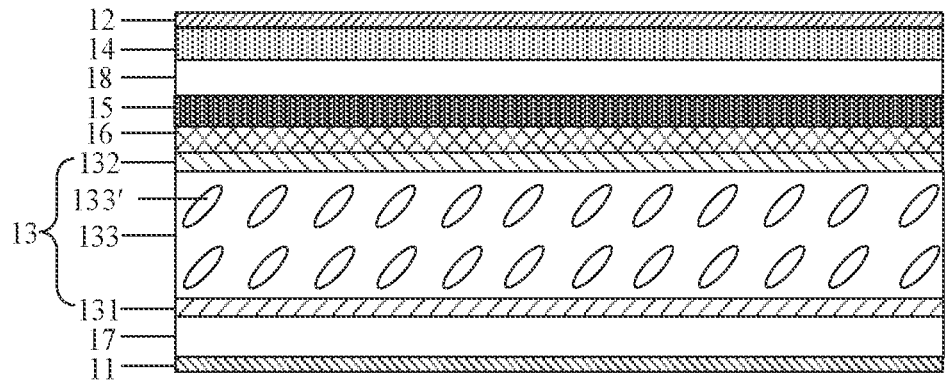
FIG. 6K is a diagram showing a structure of yet another liquid crystal display panel, in accordance with some embodiments.
Figure 6L:
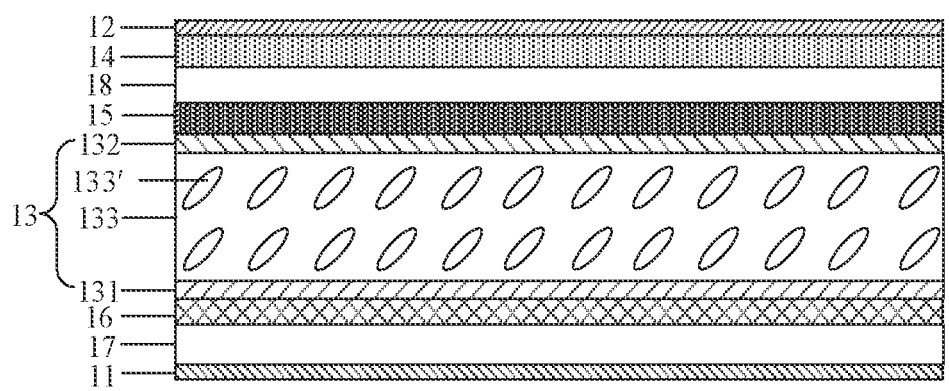
FIG. 6L is a diagram showing a structure of yet another liquid crystal display panel, in accordance with some embodiments.
Figure 6M:
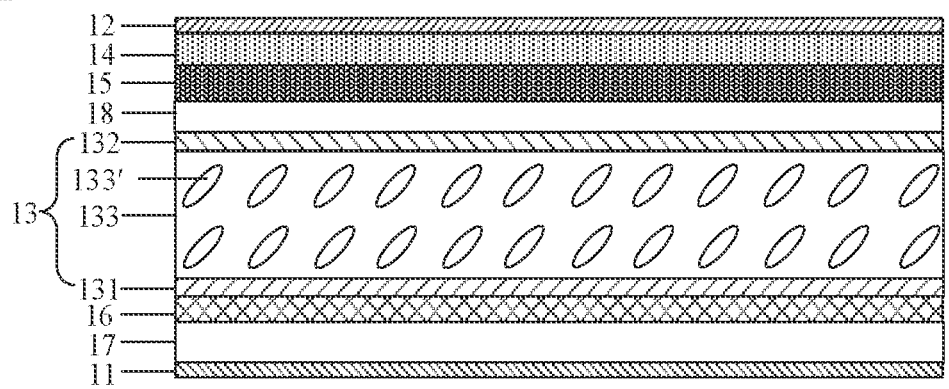
FIG. 6M is a diagram showing a structure of yet another liquid crystal display panel, in accordance with some embodiments.
Figure 6N:
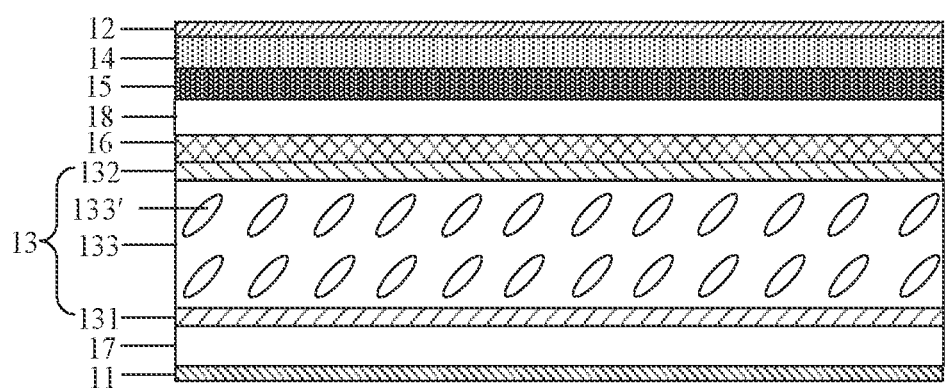
FIG. 6N is a diagram showing a structure of yet another liquid crystal display panel, in accordance with some embodiments.

Referring to FIGS. 6A to 6N, in some embodiments, the liquid crystal display panel 1 further includes a third optical compensation layer 16. The third optical compensation layer 16 is disposed between the first base substrate 17 and the liquid crystal layer 13 (as shown in FIG. 6F), or between the second base substrate 18 and the liquid crystal layer 13 (as shown in FIG. 6C). An orthographic projection of an optical axis of the third optical compensation layer 16 on the first base substrate 17 is parallel to orthographic projections of optical axes of the first liquid crystal molecules in the liquid crystal layer 13 on the first base substrate 17.

The third optical compensation layer 16 includes an anisotropic crystal layer having at least one optical axis. In some embodiments, the third optical compensation layer 16 is a uniaxial optical compensation layer having only a single optical axis. On this basis, for example, the third optical compensation layer 16 is a +A compensation film layer. The +A compensation film layer satisfies a condition that $n_{x3}$ is greater than $n_{y3}$ and $n_{y3}$ is approximately equal to $n_{z3}$ (i.e., $n_{x3} > n_{y3} \approx n_{z3}$) or $n_{x3}$ is greater than $n_{y3}$ and $n_{y3}$ is equal to $n_{z3}$ (i.e., $n_{x3} > n_{y3} = n_{z3}$), where $n_{x3}$ is a refractive index of the +A compensation film layer in a direction of $X_3$ axis in a plane where the +A compensation film layer is located, $n_{y3}$ is a refractive index of the +A compensation film layer in a direction of $Y_3$ axis that is perpendicular to the $X_3$ axis in the plane where the +A compensation film layer is located, and $n_{z3}$ is a refractive index of the +A compensation film layer in a thickness direction thereof. The $X_3$ axis is the optical axis of the third optical compensation layer 16. It will be noted that, in a case where there is a small tilt angle (e.g., a tilt angle within 5°) between the $X_3$ axis and the +A compensation film layer, the $X_3$ axis may also be considered to be in the plane where the +A compensation film layer is located. It will be understood that in a case where there is a small tilt angle between the $X_3$ axis and the +A compensation film layer, there may be a certain difference between $n_{y3}$ and $n_{z3}$. Considering the above situation, $n_{y3}$ may be equal to or approximately equal to $n_{z3}$.

Referring to FIG. 3A, in the related art, when the liquid crystal display panel is subjected to external pressure (e.g., a pressing force applied on the liquid crystal display panel by a frame, a bending force to which the liquid crystal display panel is subjected in a case where the liquid crystal display panel is a curved display panel, etc.) in the L0 state, a non-uniform external force will cause the first base substrate 17 and the second base substrate 18 to change from isotropic media into optically anisotropic media, resulting in non-uniform birefringence of polarized light passing through the first base substrate 17 and the second base substrate 18. As a result, a polarization state of the polarized light changes. A phase retardation caused by the first base substrate 17 and a phase retardation caused by the second base substrate 18 are equal in magnitude and opposite in direction. In a case where there is no liquid crystal layer 13 between the first base substrate 17 and the second base substrate 18, the two phase retardations may offset each other. However, in a case where there is a liquid crystal layer 13 between the first base substrate 17 and the second base substrate 18, a phase difference may be generated when the polarized light passes through the liquid crystal layer 13, and the phase retardation caused by the first base substrate 17 and the phase retardation caused by the second base substrate 18 cannot offset each other. For example, with continued reference to FIG. 3A, the first polarizer 11 is provided on a side of the first base substrate 17 away from the liquid crystal layer 13, and the second polarizer 12 is provided on a side of the second base substrate 18 away from the liquid crystal layer 13. Natural light emitted by the backlight module 2 becomes linearly polarized light after passing through the first polarizer 11, and the linearly polarized light becomes elliptically polarized light due to phase retardations after passing through the first base substrate 17, the liquid crystal layer 13 and the second base substrate 18 in sequence. The elliptically polarized light may exit through the second polarizer 12, thereby generating light leakage. This is a light leakage phenomenon due to pressure.

Referring to FIGS. 6A to 6N, in some embodiments, the first optical compensation layer 14 is disposed on a side of the first base substrate 17 or the second base substrate 18 away from the liquid crystal layer 13. That is, in some examples, the first optical compensation layer 14 is disposed between the first base substrate 17 and the first polarizer 11 (as shown in FIGS. 6D to 6J). In some other examples, the first optical compensation layer 14 is disposed between the second base substrate 18 and the second polarizer 12 (as shown in FIGS. 6A to 6C and 6K to 6N).

In a case where the first optical compensation layer 14 is disposed on the side of the first base substrate 17 or the second base substrate 18 away from the liquid crystal layer 13 and the first optical compensation layer 14 is the +A compensation film layer, the +A compensation film layer satisfies a condition that $n_{x1}$ is greater than $n_{y1}$ and $n_{y1}$ is equal to $n_{z1}$ (i.e., $nx_1 > n_{y1} = n_{z1}$), where $n_{x1}$ is the refractive index of the +A compensation film layer in the direction of the $X_1$ axis in the plane where the +A compensation film layer is located, $n_{y1}$ is the refractive index of the +A compensation film layer in the direction of the $Y_1$ axis that is perpendicular to the $X_1$ axis in the plane where the +A compensation film layer is located, and $n_{z1}$ is the refractive index of the +A compensation film layer in the thickness direction thereof.

In the case where the first optical compensation layer 14 is disposed on the side of the first base substrate 17 or the second base substrate 18 away from the liquid crystal layer 13, for example, the first optical compensation layer 14 may be provided as an optical compensation film layer based on a stretched polymer film. In this way, it is convenient to manufacture the first optical compensation layer 14 outside a liquid crystal cell, thereby helping to simplify a manufacturing process of the liquid crystal display panel.

In the case where the first optical compensation layer 14 is disposed on the side of the first base substrate 17 or the second base substrate 18 away from the liquid crystal layer 13, for example, the second optical compensation layer 15 may be disposed on the side of the first optical compensation layer 14 away from the liquid crystal layer 13 (as shown in FIGS. 6A, 6B, 6D and 6E), or the second optical compensation layer 15 may also be disposed between the first base substrate 17 and the second base substrate 18 (as shown in FIGS. 6C, 6F, 6G, 6H, 6K and 6L), or the second optical compensation layer 15 may also be disposed between the first base substrate 17 and the first optical compensation layer 14 (as shown in FIGS. 6I and 6J), or the second optical compensation layer 15 may also be disposed between the second base substrate 18 and the first optical compensation layer 14 (as shown in FIGS. 6M and 6N).

In the case where the first optical compensation layer 14 is disposed on the side of the first base substrate 17 or the second base substrate 18 away from the liquid crystal layer 13, for example, a sum of an in-plane retardation $R_{O2}$ of the third optical compensation layer 16 and an in-plane retardation $R_{OLC}$ of the liquid crystal layer 13 is equal to a positive integer multiple of a first wavelength, and the first wavelength is in a range of a difference between 535 nm and 50 nm to a sum of 535 nm and 50 nm.

$R_{O2}$ is equal to a product of $d_3$ and a difference of $n_{x3}$ and $n_{y3}$ (i.e., $R_{O2} = (n_{x3} - n_{y3}) \times d_3$), where $n_{x3}$ is a refractive index of the third optical compensation layer 16 in a direction of $X_3$ axis in a plane where the third optical compensation layer 16 is located, and $n_{y3}$ is a refractive index of the third optical compensation layer 16 in a direction of $Y_3$ axis that is perpendicular to the $X_3$ axis in the plane where the third optical compensation layer 16 is located, and $d_3$ is a thickness of the third optical compensation layer 16. $R_{O2}$ is the in-plane retardation of the third optical compensation layer 16, and may be understood as an actual retardation of light passing through the third optical compensation layer 16 in a normal direction (vertical direction).

$R_{OLC}$ is equal to a product of $d_{LC}$ and a difference of $n_{xLC}$ and $n_{yLC}$ (i.e., $R_{OLC} = (n_{xLC} - n_{yLC}) \times d_{LC}$), where $n_{xLc}$ is a refractive index of the liquid crystal layer 13 in a direction of X axis in a plane where the liquid crystal layer 13 is located, $n_{yLC}$ is a refractive index of the liquid crystal layer 13 in a direction of Y axis that is perpendicular to the X axis in the plane where the liquid crystal layer 13 is located, and $d_{LC}$ is a thickness of the liquid crystal layer 13. The X axis is an optical axis of the first liquid crystal molecule in the liquid crystal layer 13. It will be noted that, in a case where there is a small tilt angle (e.g., a tilt angle within 5°) between the X axis and the liquid crystal layer 13, the X axis may also be considered to be in the plane where the liquid crystal layer 13 is located. $R_{OLC}$ is the in-plane retardation of the liquid crystal layer 13 and may be understood as an actual retardation of light passing through the liquid crystal layer 13 in a normal direction (vertical direction).

In this structure, the third optical compensation layer 16 functions as a forward compensation to offset the phase retardation of the polarized light caused by the liquid crystal layer 13. In this way, phase retardations caused by the first base substrate 17 and the second base substrate 18 may also be offset, so that light exiting from the second base substrate 18 may return to a polarization state as before entering the first base substrate 17 to a certain extent. For example, linearly polarized light exiting from the first polarizer 11 will not change its polarization state after passing through the first base substrate 17, the third optical compensation layer 16, the liquid crystal layer 13 and the second base substrate 18, and is still the linearly polarized light, the polarization direction of which is perpendicular to the transmission axis of the second polarizer 12, and thus is unable to exit from the second polarizer 12. Therefore, when the liquid crystal display panel 1 is subjected to pressure in the L0 state, most of the light from the backlight module 2 is unable to exit from the liquid crystal display panel 1, thereby ameliorating the light leakage problem due to pressure in the dark state.

It will be noted that a relative position of the third optical compensation layer 16 and the liquid crystal layer 13 is not limited here, and may be determined according to actual needs. For example, the linearly polarized light may first pass through the third optical compensation layer 16 and then pass through the liquid crystal layer 13. Alternatively, the linearly polarized light may first pass through the liquid crystal layer 13 and then pass through the third optical compensation layer 16.

In some embodiments, by adjusting refractive index properties of the third optical compensation layer 16 and/or liquid crystal molecules in the liquid crystal layer 13, and adjusting the thickness of the third optical compensation layer 16 and/or the liquid crystal layer 13, it is possible to make a sum of the in-plane retardation $R_{O2}$ of the third optical compensation layer 16 and the in-plane retardation $R_{OLC}$ of the liquid crystal layer 13 be equal to a positive integer multiple of the first wavelength.

The first wavelength is in a range of a difference between 535 nm and 50 nm to a sum of 535 nm and 50 nm. That is, a minimum value of the first wavelength is 485 nm, a maximum value thereof is 585 nm, and a median value thereof is 535 nm. In a case where a sum of the in-plane retardation of the third optical compensation layer 16 and the in-plane retardation of the liquid crystal layer 13 is 535 nm, not only the light leakage due to pressure at a front viewing angle and a side viewing angle may be reduced significantly when the liquid crystal display panel 1 is in the L0 state, but also the leaked light appears bluish when the liquid crystal display panel 1 is viewed from the side viewing angle. Compared with the color cast of red, yellow and green, the color cast of blue is more acceptable. Therefore, the first wavelength is set to be in the range of a difference between 535 nm and 50 nm to a sum of 535 nm and 50 nm, and the display effect may be further improved.

In some embodiments, the in-plane retardation $R_{O2}$ of the third optical compensation layer 16 is in a range of 160 nm to 240 nm, and the in-plane retardation $R_{OLC}$ of the liquid crystal layer 13 is in a range of a difference between 350 nm and 25 nm to a sum of 350 nm and 25 nm. For example, the in-plane retardation $R_{O2}$ of the third optical compensation layer 16 is 160 nm, 180 nm, 200 nm, 210 nm, 220 nm or 240 nm. For example, a minimum value of the in-plane retardation $R_{OLC}$ of the liquid crystal layer 13 is 325 nm, a maximum value thereof is 375 nm, and a median value thereof is 350 nm. In a case where the in-plane retardation $R_{O2}$ of the third optical compensation layer 16 is in the range of 160 nm to 240 nm, a forward compensation effect of the third optical compensation layer 16 is good. Moreover, the in-plane retardation $R_{O2}$ of the third optical compensation layer 16 is matched with an appropriate in-plane retardation $R_{OL}$c of the liquid crystal layer 13, so that it is possible to provide a variety of matching combinations of the third optical compensation layer 16 and the liquid crystal layer 13, and eventually ensure that the liquid crystal display panel 1 has a good display effect.

In some embodiments, the in-plane retardation $R_{O2}$ of the third optical compensation layer 16 is in a range of a difference between 185 nm and 25 nm to a sum of 185 nm and 25 nm, and the in-plane retardation $R_{OLC}$ of the liquid crystal layer 13 is in a range of a difference between 350 nm and 25 nm to a sum of 350 nm and 25 nm. For example, a minimum value of the in-plane retardation $R_{O2}$ of the third optical compensation layer 16 is 160 nm, a maximum value thereof is 210 nm, and a median value thereof is 185 nm. The minimum value of the in-plane retardation $R_{OLC}$ of the liquid crystal layer 13 is 325 nm, the maximum value thereof is 375 nm, and the median value thereof is 350 nm. In a case where the in-plane retardation $R_{O2}$ of the third optical compensation layer 16 is in the range of a difference between 185 nm and 25 nm to a sum of 185 nm and 25 nm, a forward compensation effect of the third optical compensation layer 16 is good. Moreover, the in-plane retardation $R_{O2}$ of the third optical compensation layer 16 is matched with an appropriate in-plane retardation $R_{OL}$c of the liquid crystal layer 13, so that it is possible to provide a variety of matching combinations of the third optical compensation layer 16 and the liquid crystal layer 13, and eventually ensure that the liquid crystal display panel 1 has a good display effect.

Figure 6O:
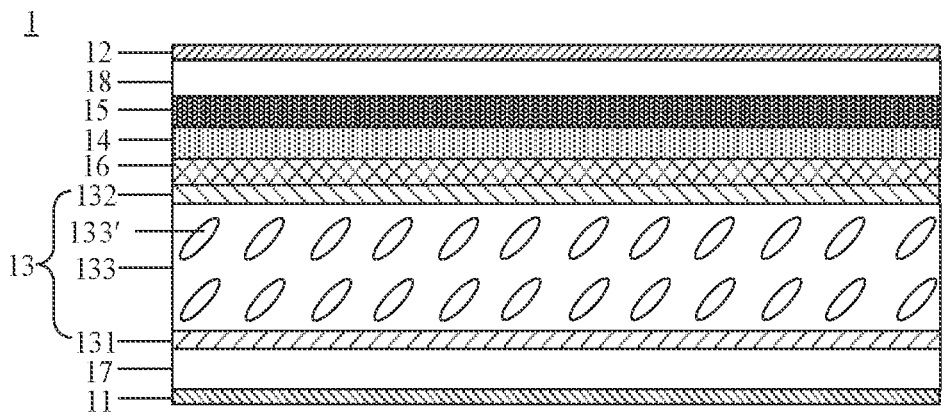
FIG. 6O is a diagram showing a structure of yet another liquid crystal display panel, in accordance with some embodiments.
Figure 6P:
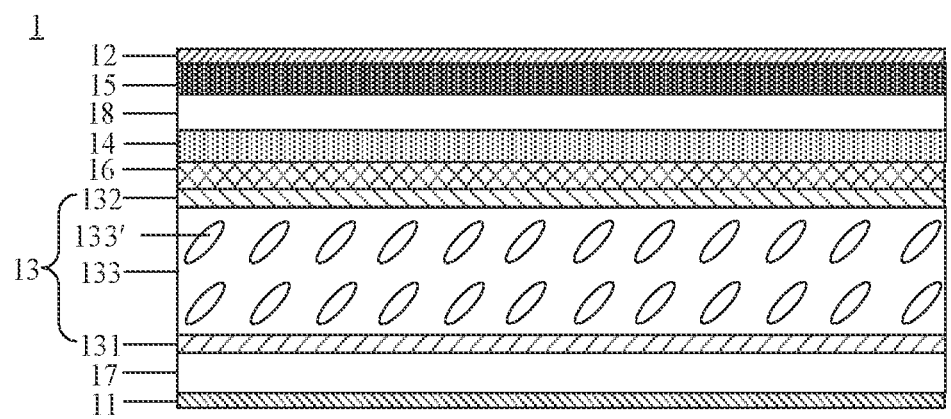
FIG. 6P is a diagram showing a structure of yet another liquid crystal display panel, in accordance with some embodiments.

In some other embodiments, as shown in FIGS. 6O and 6P, the first optical compensation layer 14 is disposed between the first base substrate 17 and the second base substrate 18. On this basis, the second optical compensation layer 15 may be disposed between the first base substrate 17 and the second base substrate 18 (as shown in FIG. 6O), or the second optical compensation layer 15 may be disposed on the side of the first base substrate 17 away from the liquid crystal layer 13, or the second optical compensation layer 15 may be disposed on the side of the second base substrate 18 away from the liquid crystal layer 13 (as shown in FIG. 6P).

In a case where the first optical compensation layer 14 is disposed between the first base substrate 17 and the second base substrate 18, and the first optical compensation layer 14 is a +A compensation film layer based on coated liquid crystal molecules, the +A compensation film layer satisfies a condition that $n_{x1}$ is greater than $n_{y1}$ and $n_{y1}$ is approximately equal to $n_{z1}$ (i.e., $n_{x1} > n_{y1} \approx n_{z1}$), where $n_{x1}$ is the refractive index of the +A compensation film layer in the direction of the $X_1$ axis in the plane where the +A compensation film layer is located, $n_{y1}$ is the refractive index of the +A compensation film layer in the direction of the $Y_1$ axis that is perpendicular to the $X_1$ axis in the plane where the +A compensation film layer is located, and $n_{z1}$ is the refractive index of the +A compensation film layer in the thickness direction thereof. It will be understood that, in the case where liquid crystal molecules in the first optical compensation layer 14 have a pretilt angle, there is a certain difference between $n_{y1}$ and $n_{z1}$. Considering the above situation, $n_{y1}$ may be approximately equal to $n_{z1}$.

In the case where the first optical compensation layer 14 is disposed between the first base substrate 17 and the second base substrate 18, for example, the in-plane retardation of the first optical compensation layer 14 is $R_{O1}$, the in-plane retardation of the third optical compensation layer 16 is $R_{O2}$, and the in-plane retardation of the liquid crystal layer 13 is $R_{OLC}$. $R_{O1}$, $R_{O2}$ and $R_{OLC}$ satisfy the following formula:

$$R_{O2} - R_{O1} + R_{OLC} = n\lambda;$$

where n is an integer, λ is the first wavelength, and the first wavelength is in the range of a difference between 535 nm and 50 nm to a sum of 535 nm and 50 nm.

In this structure, the first optical compensation layer 14 and the third optical compensation layer 16 perform a compensation function together to offset the phase retardation of the polarized light caused by the liquid crystal layer 13. In this way, the phase retardations caused by the first base substrate 17 and the second base substrate 18 may also be offset, so that the light exiting from the second base substrate 18 may return to a polarization state as before entering the first base substrate 17 to a certain extent. For example, the linearly polarized light exiting from the first polarizer 11 will not change its polarization state after passing through the first base substrate 17, the first optical compensation layer 14, the third optical compensation layer 16, the liquid crystal layer 13 and the second base substrate 18, and is still the linearly polarized light, the polarization direction of which is perpendicular to the transmission axis of the second polarizer 12, and thus is unable to exit from the second polarizer 12. Therefore, when the liquid crystal display panel 1 is subjected to pressure in the L0 state, most of the light from the backlight module 2 is unable to exit from the liquid crystal display panel 1, thereby ameliorating the light leakage problem due to pressure in the dark state.

It will be noted that, in a case where the first optical compensation layer 14, the third optical compensation layer 16 and the liquid crystal layer 13 are all located between the first base substrate 17 and the second base substrate 18, relative positions of the first optical compensation layer 14, the third optical compensation layer and the liquid crystal layer 13 are not limited here, and may be determined according to actual needs.

In the case where the first optical compensation layer 14 is disposed between the first base substrate 17 and the second base substrate 18, for example, the first optical compensation layer 14 may be provided as an optical compensation film layer based on coated liquid crystal molecules. In this way, the first optical compensation layer 14 and the liquid crystal layer 13 may be fabricated together and disposed between the first base substrate 17 and the second base substrate 18, thereby helping to simplify the manufacturing process of the liquid crystal display panel.

Figure 7A:
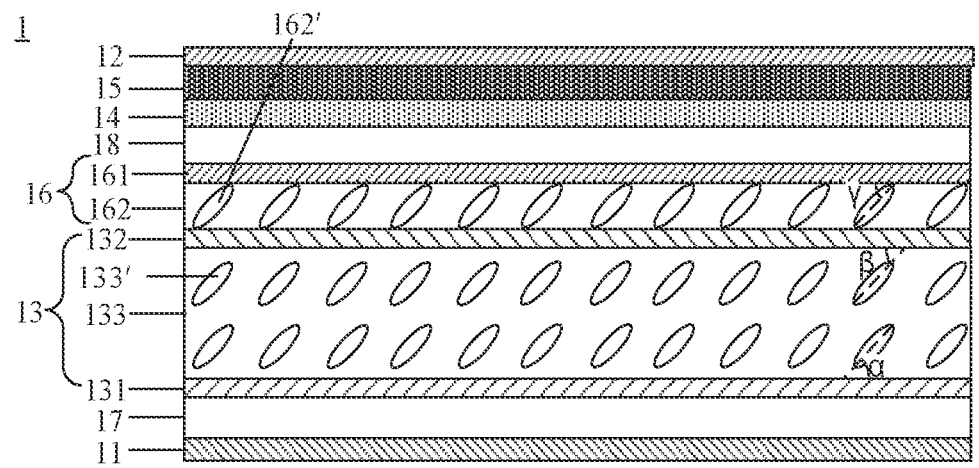
FIG. 7A is a diagram showing a structure of yet another liquid crystal display panel, in accordance with some embodiments.

The type of the third optical compensation layer 16 is determined according to actual use requirements and/or process requirements, and is not limited in the embodiments of the present disclosure. In some embodiments, the third optical compensation 16 is an optical compensation film layer based on coated liquid crystal molecules. In this case, referring to FIG. 7A, the third optical compensation layer 16 includes a third alignment film 161 and a second liquid crystal molecular layer 162. The third alignment film 161 is configured to anchor a part of second liquid crystal molecules 162' proximate to the third alignment film 161 in the second liquid crystal molecular layer 162, so that the part of second liquid crystal molecules 162' proximate to the third alignment film 161 have a third pretilt angle. In a case where the liquid crystal layer 13 includes the first alignment film 131, the second alignment film 132 and the first liquid crystal molecular layer 133, orthographic projections of optical axes of second liquid crystal molecules in the second liquid crystal molecular layer 162 on the first base substrate 17 are parallel to the orthographic projections of the optical axes of the first liquid crystal molecules in the liquid crystal layer 13 on the first base substrate 17. An alignment direction of the third alignment film 161 is the same as the alignment direction of the first alignment film 131.

Figure 8A:
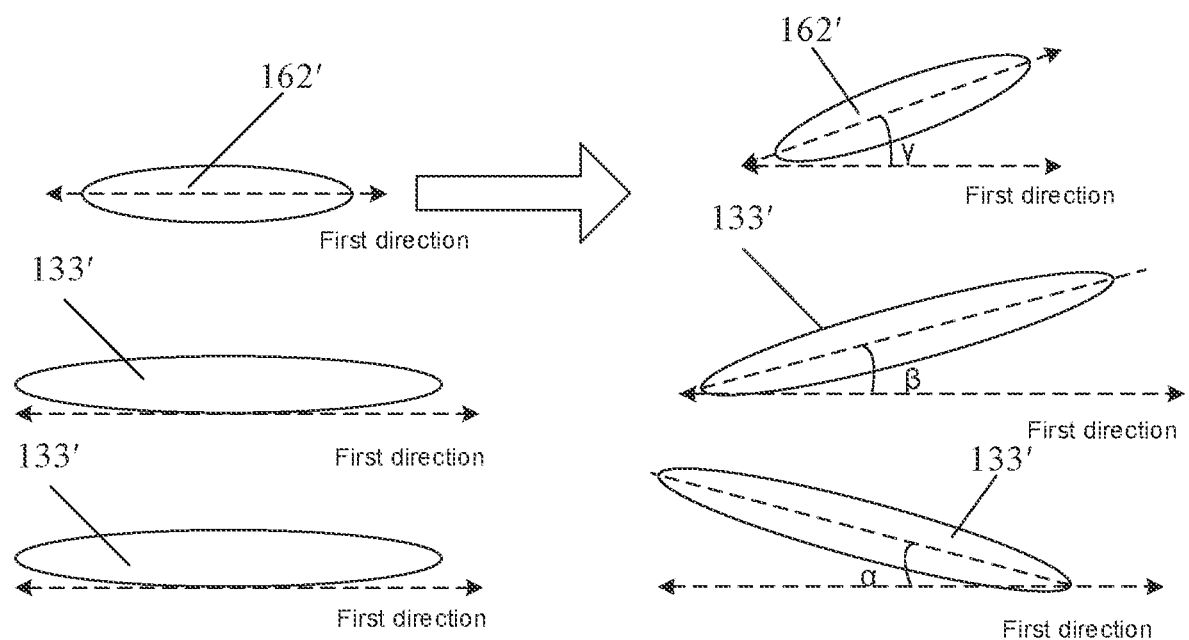
FIG. 8A is a cubic chart showing distribution states of first liquid crystal molecules and second liquid crystal molecules, in accordance with some embodiments.

In a case where the alignment direction of the third alignment film 161 is parallel to alignment directions of the first alignment film 131 and the second alignment film 132, for example, referring to FIG. 8A, the first liquid crystal molecules 133' and the second liquid crystal molecules 162' are all rod-like liquid crystal molecules; long axes of the second liquid crystal molecules 162' without a pretilt angle are parallel to long axes of the first liquid crystal molecules 133' without a pretilt angle, and first liquid crystal molecules 133' arranged in a layer that are proximate to the second liquid crystal molecules 162' are parallel to first liquid crystal molecules 133' arranged in a layer that are away from the second liquid crystal molecules 162'. When first liquid crystal molecules 133' arranged in a layer that are away from the second liquid crystal molecules 162' have a first pretilt angle α, first liquid crystal molecules 133' arranged in a layer that are proximate to the second liquid crystal molecules 162' have a second pretilt angle β, and the second liquid crystal molecules 162' have a third pretilt angle γ, orthographic projections of the long axes of the second liquid crystal molecules 162' on the first polarizer 11 are parallel to orthographic projections of the long axes of first liquid crystal molecules 133' arranged in the two layers, which are respectively a layer proximate to the second liquid crystal molecules 162' and a layer away from the second liquid crystal molecules 162', on the first polarizer 11. The first pretilt angle α is an acute angle between a long axis direction of the first liquid crystal molecule 133' and a first direction, the second pretilt angle β is an acute angle between the long axis direction of the first liquid crystal molecule 133' and the first direction, and the third pretilt angle γ is an acute angle between a long axis direction of the second liquid crystal molecule 162' and the first direction.

It will be understood by those skilled in the art that, since pretilt angles of the second liquid crystal molecule 162' and the first liquid crystal molecule 133' are both small, the second liquid crystal molecule 162' with the pretilt angle is parallel to the first liquid crystal molecule 133' with the pretilt angle. The description that the second liquid crystal molecule 162' is parallel to the first liquid crystal molecule 133' may be understood that the long axis direction of the second liquid crystal molecule 162' is parallel to the long axis direction of the first liquid crystal molecule 133'.

Referring to FIG. 8A, in a case where alignment directions of the first alignment film 131, the second alignment film 132 and the third alignment film 161 are determined, the first pretilt angle α, the second pretilt angle β and the third pretilt angle γ may each change in a range of 0° to 180°. However, during fabrication, in order to facilitate formation, measurement and description of the pretilt angle, only an acute angle between a long axis direction of a liquid crystal molecule and an alignment direction of an alignment film is referred to as the pretilt angle. After the long axis direction of the liquid crystal molecule rotates around a vertex of the pretilt angle thereof by the pretilt angle, the long axis direction of the liquid crystal molecule will coincide with the alignment direction of the alignment film. This rotation direction of the long axis direction is defined as a direction of the pretilt angle, and the clockwise direction thereof is defined as a forward direction, and the counterclockwise direction thereof is defined as a reverse direction.

The alignment film is made of a polymer material, such as polyimide (PI). The alignment directions of the alignment films (including the first alignment film 131, the second alignment film 132 and the third alignment film 161) include the first direction and a second direction. The pretilt angle is an included angle formed between the long axis direction of the liquid crystal molecule (including the first liquid crystal molecule 133' and the second liquid crystal molecule 162') and the alignment direction of the alignment film through a production process of the alignment film on a basis that the alignment direction of the alignment film is determined. For example, the first direction and the second direction are perpendicular to each other, and the first direction and the second direction are parallel to a plane where the alignment film is located.

Figure 8B:
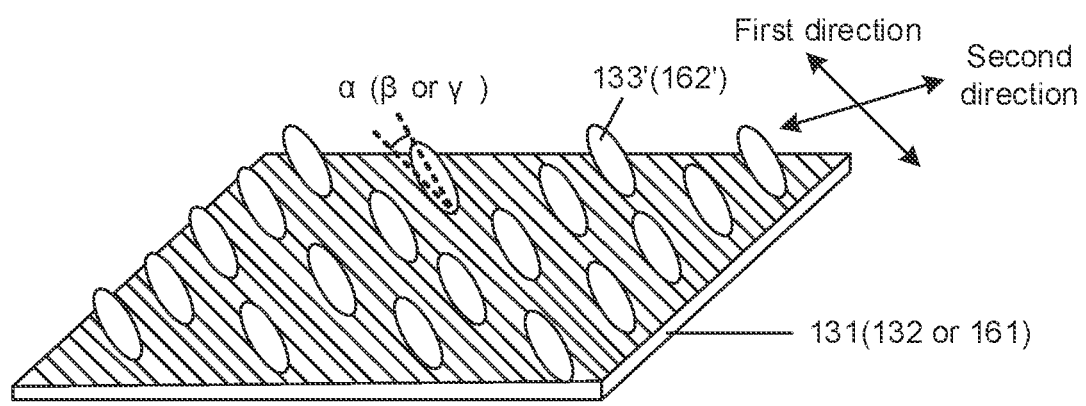
FIG. 8B is a diagram showing a structure of a first alignment film (a second alignment film or a third alignment film), in accordance with some embodiments.

For example, referring to FIG. 8B, in a case where the alignment directions of the first alignment film 131, the second alignment film 132 and the third alignment film 161 are all in the first direction, an included angle between the long axis direction of the first liquid crystal molecule 133' and the first direction is the first pretilt angle α or the second pretilt angle β, and an included angle between the long axis direction of the second liquid crystal molecule 162' and the first direction is the third pretilt angle γ.

Figure 8C:
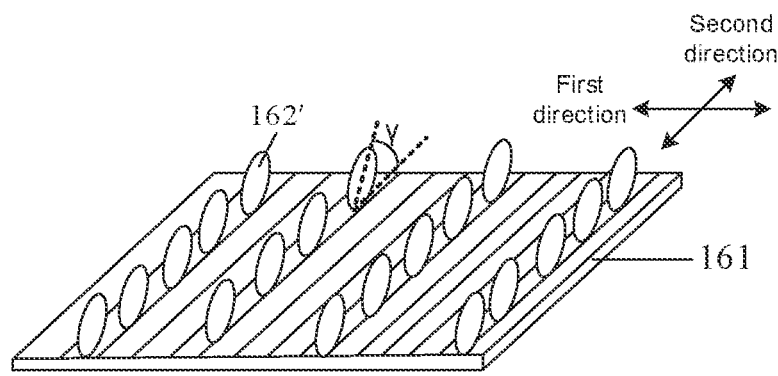
FIG. 8C is a diagram showing a structure of a third alignment film, in accordance with some embodiments.

For another example, referring to FIG. 8C, in a case where the alignment direction of the third alignment film 161 is the second direction, an included angle between the long axis direction of the second liquid crystal molecule 162' and the second direction is the third pretilt angle γ.

For example, the first alignment film 131, the second alignment film 132 and the third alignment film 161 may each be formed through a rubbing alignment process. Rubbing directions of the first alignment film 131, the second alignment film 132 and the third alignment film 161 include respective information about the alignment direction and the pretilt angle of the first alignment film 131, the second alignment film 132 and the third alignment film 161. That is, the rubbing direction may determine the alignment direction and the direction of the pretilt angle.

Figure 7B:
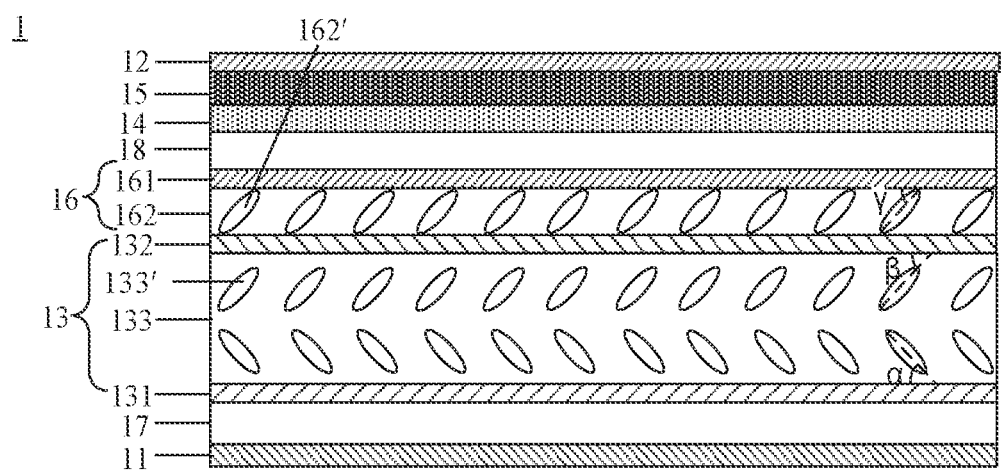
FIG. 7B is a diagram showing a structure of yet another liquid crystal display panel, in accordance with some embodiments.
Figure 8D:
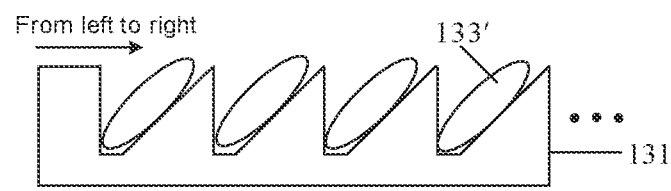
FIG. 8D is a cross-sectional view of a first alignment film, in accordance with some embodiments.
Figure 8E:
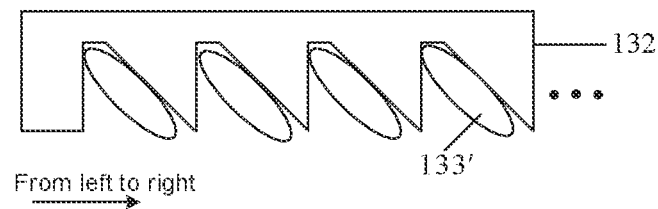
FIG. 8E is a cross-sectional view of a second alignment film, in accordance with some embodiments.

For example, referring to FIGS. 8D and 8E, oblique upward (i.e., oblique to the first liquid crystal molecules 133') angles are formed on an upper surface (i.e., a surface proximate to the first liquid crystal molecules 133') of the alignment film (e.g., the first alignment film 131) relative to a lower surface (i.e., a surface away from the first liquid crystal molecule 133') thereof during performing the rubbing alignment process. For example, referring to FIGS. 8D and 8E, when rubbing is performed from left to right, slopes oblique to upper right or oblique to lower right will be presented from left to right in the alignment directions of the alignment films (including the first alignment film 131 and the second alignment film 132). Although directions of the first pretilt angle α and the second pretilt angle β are different, the first alignment film 131 and the second alignment film 132 may be fabricated through a same process in practice. In a fabrication process, a state of the first alignment film 131 is as shown in FIG. 8D. In a using process, as shown in FIG. 7B, since the first alignment film 131 and the second alignment film 132 are arranged opposite to each other, the directions of the first pretilt angle α and the second pretilt angle β are different. But actually, a rubbing direction of the first alignment film 131 is the same as a rubbing direction of the second alignment film 132 in the fabrication process.

Figure 8F:
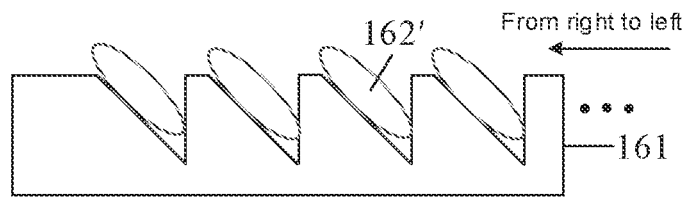
FIG. 8F is a cross-sectional view of a third alignment film, in accordance with some embodiments.

In a case where the alignment direction of the third alignment film 161 is the same as alignment directions of the first alignment film 131 and the second alignment film 132, rubbing may be performed from left to right, or from right to left. In a case where rubbing is performed from left to right, included angles oblique to upper right or oblique to lower right will be presented from left to right in the alignment direction of the third alignment film 161. In a case where rubbing is performed from right to left, included angles oblique to upper left (as shown in FIG. 8F) or oblique to lower left will be presented from right to left in the alignment direction of the third alignment film 161. Based on this, the second liquid crystal molecules 162' proximate to the third alignment film 161 may generate the third pretilt angle γ under action of the third alignment film 161. Therefore, the rubbing directions of the first alignment film 131, the second alignment film 132 and the third alignment film 161 may determine respective alignment directions of the first alignment film 131, the second alignment film 132 and the third alignment film 161, and respective directions of pretilt angles the liquid crystal molecules.

It is worth noting that each alignment direction mentioned in the embodiments of the present disclosure may include two rubbing directions. For example, the alignment direction is the first direction, which may not only include a rubbing direction (as shown in FIG. 8D) from one end to the other end in the first direction, but also include a rubbing direction (as shown in FIG. 8F) along a path opposite to the path "from one end to the other end".

Based on the above, it will be understood by those skilled in the art that the rubbing direction may determine the direction of the pretilt angle. In a case where alignment directions of alignment films are the same, if rubbing directions are different, the directions of the pretilt angles may be different. For example, when the alignment directions of the alignment films are all in the first direction, a direction of pretilt angles generated when rubbing is performed from left to right is opposite to a direction of pretilt angles generated when rubbing is performed from right to left.

In some other embodiments, the directions of the first pretilt angle α and the second pretilt angle β are the same. For example, the directions of the first pretilt angle α and the second pretilt angle β are both the forward direction (referring to FIG. 7A), or the directions of the first pretilt angle α and the second pretilt angle β are both the reverse direction. On this basis, directions of the third pretilt angle γ and the first pretilt angle α are the same. For example, in a case where the directions of the first pretilt angle α and the second pretilt angle β are both the forward direction, a direction of the third pretilt angle γ is also the forward direction (referring to FIG. 7A). For another example, in a case where the directions of the first pretilt angle α and the second pretilt angle β are both the reverse direction, the direction of the third pretilt angle γ is also the reverse direction.

With such an arrangement, directions of the first pretilt angle α, the second pretilt angle β and the third pretilt angle γ are the same, which may improve the compensation effect of the third optical compensation layer 16 on the in-plane retardation of the liquid crystal layer 13. On one hand, most of the light entering the second polarizer 12 is the linearly polarized light, the polarization direction of which is perpendicular to the transmission axis of the second polarizer 12, so that light leakage may be reduced. On the other hand, most of red light and green light is controlled to be linearly polarized light when entering the second polarizer 12, so that transmittances of the red light and the green light are reduced, and the color cast problem may be further ameliorated.

In some other embodiments, in a case where the directions of the first pretilt angle α and the second pretilt angle β are the same, the direction of the third pretilt angle γ may also be opposite to the direction of the first pretilt angle α.

In yet some other embodiments, the direction of the first pretilt angle α is opposite to the direction of the second pretilt angle β. For example, the direction of the first pretilt angle α is the forward direction, and the direction of the second pretilt angle β is the reverse direction. Alternatively, referring to FIGS. 7B and 8A, the direction of the first pretilt angle α is the reverse direction, and the direction of the second pretilt angle 3 is the forward direction. On this basis, the direction of the third pretilt angle γ may be set to be the same as the direction of the first pretilt angle α, or may be set to be the same as the direction of the second pretilt angle β.

In some embodiments, the first pretilt angle α, the second pretilt angle β and the third pretilt angle γ are equal in magnitude.

For example, the first pretilt angle α, the second pretilt angle β and the third pretilt angle γ are equal in magnitude, which means that degrees of the pretilt angles are equal regardless of the alignment directions of the alignment films (including the first alignment film 131, the second alignment film 132 and the third alignment film 161). No matter whether the alignment direction of the third alignment film 161 is the same as the alignment directions of the first alignment film 131 and the second alignment film 132, a magnitude of the third pretilt angle γ may be set to be equal to or approximately equal to magnitudes of the first pretilt angle α and the second pretilt angle β.

In a case where the first pretilt angle α, the second pretilt angle β and the third pretilt angle γ are equal or approximately equal in magnitude, the difficulty in fabricating the alignment films may be reduced.

In some embodiments, the first pretilt angle α, the second pretilt angle β and the third pretilt angle γ are in a range of a difference between 2° and 2° to a sum of 2° and 2° (i.e., a maximum value is 4°, a minimum value is 0°, and a median value is 2°). In some examples, the first pretilt angle α, the second pretilt angle β and the third pretilt angle γ are in a range of a difference between 2° and 1° to a sum of 2° and 1° (i.e., a maximum value is 3°, a minimum value is 1°, and a median value is 2°). For example, the first pretilt angle α, the second pretilt angle β and the third pretilt angle γ are all 1°. For another example, the first pretilt angle α, the second pretilt angle β and the third pretilt angle γ are all 2°. For yet another example, the first pretilt angle α, the second pretilt angle β and the third pretilt angle γ are all 3°.

Since degrees of the first pretilt angle α, the second pretilt angle β and the third pretilt angle γ are all small, for example, 1°, even if the direction of the first pretilt angle α is different from the direction of the second pretilt angle β, the long axis directions of the first liquid crystal molecules 133' proximate to the first alignment film 131 are approximately parallel to the long axis directions of the first liquid crystal molecules 133' proximate to the second alignment film 132. In a case where the alignment direction of the third alignment film 161 is the same as the alignment direction of the first alignment film 131, the long axis directions of the second liquid crystal molecules 162' are approximately the same as the long axis directions of the first liquid crystal molecules 133'. The long axis directions of the second liquid crystal molecules 162' are parallel to the long axis directions of the first liquid crystal molecules 133', so that the third optical compensation layer 16 may realize forward compensation for the liquid crystal layer 13, and the light leakage and the color cast phenomenon of the liquid crystal display panel 1 in the L0 state may be ameliorated.

Based on the above, regardless of the magnitudes of the first pretilt angle α and the second pretilt angle β, the orthographic projections of the long axes of the first liquid crystal molecules 133' on a plane where the first alignment film 131, the second alignment film 132 or the third alignment film 161 is located are all in the first direction. Regardless of the magnitude of the third pretilt angle γ, in a case where the alignment direction of the third alignment film 161 is the same as the alignment directions of the first alignment film 131 and the second alignment film 132, the orthographic projections of the long axes of the second liquid crystal molecules 162' on the plane where the first alignment film 131, the second alignment film 132 or the third alignment film 161 is located are also in the first direction. Therefore, even if the fabricated first pretilt angle α, second pretilt angle β and third pretilt angle γ are different in magnitude, the liquid crystal layer 13 and the third optical compensation layer 16 may also be ensured to work normally, which reduces process requirements for fabricating the first pretilt angle α, the second pretilt angle β and the third pretilt angle γ.

In some embodiments, the first polarizer 11, the second polarizer 12, the liquid crystal layer 13, the first optical compensation layer 14, the second optical compensation layer 15, the third optical compensation layer 16, the first base substrate 17 and the second base substrate 18 may be arranged according to the following manners.

In a first manner, as shown in FIG. 6A, the first polarizer 11, the first base substrate 17, the liquid crystal layer 13, the third optical compensation layer 16, the second base substrate 18, the first optical compensation layer 14, the second optical compensation layer 15 and the second polarizer 12 are stacked in sequence. For example, the in-plane retardation $R_{O1}$ of the first optical compensation layer 14 is in a range of 150 nm to 185 nm, the thickness direction retardation $R_{th}$ of the second optical compensation layer 15 is in a range of −100 nm to −125 nm, and the in-plane retardation $R_{O2}$ of the third optical compensation layer 16 is 185 nm.

With such an arrangement, the light leakage and color cast problems at the side viewing angle and the light leakage and color cast problems due to pressure applied to the liquid crystal display panel having such a structure in the L0 state may be significantly ameliorated, and the display effect thereof is good.

In a second manner, as shown in FIG. 6B, the first polarizer 11, the first base substrate 17, the third optical compensation layer 16, the liquid crystal layer 13, the second base substrate 18, the first optical compensation layer 14 and the second optical compensation layer 15 and the second polarizer 12 are stacked in sequence. For example, the in-plane retardation $R_{O1}$ of the first optical compensation layer 14 is in a range of 150 nm to 185 nm, the thickness direction retardation $R_{th}$ of the second optical compensation layer 15 is in a range of −100 nm to −125 nm, and the in-plane retardation $R_{O2}$ of the third optical compensation layer 16 is 185 nm.

With such an arrangement, the light leakage and color cast problems at the side viewing angle and the light leakage and color cast problems due to pressure applied to the liquid crystal display panel having such a structure in the L0 state may be significantly ameliorated, and the display effect thereof is good.

In a third manner, as shown in FIG. 6C, the first polarizer 11, the first base substrate 17, the liquid crystal layer 13, the second optical compensation layer 15, the third optical compensation layer 16, the second base substrate 18, the first optical compensation layer 14 and the second polarizer 12 are stacked in sequence. For example, the in-plane retardation $R_{O1}$ of the first optical compensation layer 14 is in a range of 120 nm to 185 nm, the thickness direction retardation $R_{th}$ of the second optical compensation layer 15 is in a range of −75 nm to −125 nm, and the in-plane retardation $R_{O2}$ of the third optical compensation layer 16 is 185 nm.

With such an arrangement, the light leakage and color cast problems at the side viewing angle and the light leakage and color cast problems due to pressure applied to the liquid crystal display panel having such a structure in the L0 state may be significantly ameliorated, and the display effect thereof is good. In addition, since the second optical compensation layer and the third optical compensation layer are disposed on a same side of the liquid crystal layer, the process difficulty and the cost are balanced well and are relatively moderate.

In a fourth manner, as shown in FIG. 6D, in some examples, the first polarizer 11, the second optical compensation layer 15, the first optical compensation layer 14, the first base substrate 17, the liquid crystal layer 13, the third optical compensation layer 16, the second base substrate 18 and the second polarizer 12 are stacked in sequence. For example, the in-plane retardation $R_{O1}$ of the first optical compensation layer 14 is in a range of 150 nm to 185 nm, the thickness direction retardation $R_{th}$ of the second optical compensation layer 15 is in a range of −100 nm to −125 nm, and the in-plane retardation $R_{O2}$ of the third optical compensation layer 16 is 185 nm.

With such an arrangement, the light leakage and color cast problems at the side viewing angle and the light leakage and color cast problems due to pressure applied to the liquid crystal display panel having such a structure in the L0 state may be significantly ameliorated, and the display effect thereof is good. In addition, this structure is relatively mature in process, process difficulty is low and it is easy to be fabricated.

In a fifth manner, as shown in FIG. 6E, the first polarizer 11, the second optical compensation layer 15, the first optical compensation layer 14, the first base substrate 17, the third optical compensation layer 16, the liquid crystal layer 13, the second base substrate 18 and the second polarizer 12 are stacked in sequence. For example, the in-plane retardation $R_{O1}$ of the first optical compensation layer 14 is in a range of 150 nm to 185 nm, the thickness direction retardation $R_t$ of the second optical compensation layer 15 is in a range of −100 nm to −125 nm, and the in-plane retardation $R_{O2}$ of the third optical compensation layer 16 is 185 nm.

With such an arrangement, the light leakage and color cast problems at the side viewing angle and the light leakage and color cast problems due to pressure applied to the liquid crystal display panel having such a structure in the L0 state may be significantly ameliorated, and the display effect thereof is good.

In a sixth manner, as shown in FIG. 6F, the first polarizer 11, the first optical compensation layer 14, the first base substrate 17, the third optical compensation layer 16, the second optical compensation layer 15, the liquid crystal layer 13, the second base substrate 18 and the second polarizer 12 are stacked in sequence. For example, the in-plane retardation $R_{O1}$ of the first optical compensation layer 14 is in a range of 120 nm to 185 nm, the thickness direction retardation $R_t$ of the second optical compensation layer 15 is in a range of −75 nm to −125 nm, and the in-plane retardation $R_{O2}$ of the third optical compensation layer 16 is 185 nm.

With such an arrangement, the light leakage and color cast problems at the side viewing angle and the light leakage and color cast problems due to pressure applied to the liquid crystal display panel having such a structure in the L0 state may be significantly ameliorated, and the display effect thereof is good.

It will be understood that the in-plane retardation $R_{O2}$ in the first manner to the sixth manner may have a certain error. The error may make the in-plane retardation $R_{O2}$ be in a range of a difference between 185 nm and 25 nm to a sum of 185 nm and 25 nm.

In some embodiments, the first liquid crystal molecules are negative liquid crystal molecules. Since a light transmittance of a display panel using negative liquid crystal molecules is high in an L255 state, the liquid crystal display panel 1 using negative liquid crystal molecules has a high contrast ratio and a good display effect.

Based on the liquid crystal display panel 1 provided by some embodiments described above, referring to FIG. 1, in the display apparatus 100 provided by some embodiments of the present disclosure, the backlight module 2 is disposed on a side of the first polarizer 11 of the liquid crystal display panel 1 away from the liquid crystal layer 13 of the liquid crystal display panel 1.

In some embodiments, the orthographic projections of the optical axes of the first liquid crystal molecules in the liquid crystal layer 13 of the liquid crystal display panel 1 on the first polarizer 11 are perpendicular to the transmission axis of the first polarizer 11.

On this basis, both the first optical compensation layer 14 and the second optical compensation layer 15 of the liquid crystal display panel 1 are disposed on a side of the liquid crystal layer 13 away from the backlight module 2. On this basis, as shown in FIGS. 6A, 6B and 6C, in some examples, the liquid crystal display panel 1 may be arranged in a manner from the first manner to the third manner. In this way, the light leakage and color cast problems at the side viewing angle and the light leakage and color cast problems due to pressure applied to the liquid crystal display panel 1 in the L0 state may be significantly ameliorated, and the display effect thereof is good. As shown in FIGS. 6G, 6H, 6I and 6J, in some other examples, the liquid crystal display panel 1 may also be arranged in any of the following manners.

In a seventh manner, as shown in FIG. 6G, the first polarizer 11, the first optical compensation layer 14, the first base substrate 17, the second optical compensation layer 15, the third optical compensation layer 16, the liquid crystal layer 13, the second base substrate 18 and the second polarizer 12 are stacked in sequence. Here, the light leakage and color cast problems at the side viewing angle of the liquid crystal display panel having such a structure in the L0 state may be significantly ameliorated, and the display effect thereof is good.

In an eighth manner, as shown in FIG. 6H, the first polarizer 11, the first optical compensation layer 14, the first base substrate 17, the second optical compensation layer 15, the liquid crystal layer 13, the third optical compensation layer 16, the second base substrate 18 and the second polarizer 12 are stacked in sequence. Here, the light leakage and color cast problems at the side viewing angle of the liquid crystal display panel having such a structure in the L0 state may be significantly ameliorated, and the display effect thereof is good.

In a ninth manner, as shown in FIG. 6I, the first polarizer 11, the first optical compensation layer 14, the second optical compensation layer 15, the first base substrate 17, the liquid crystal layer 13, the third optical compensation layer 16, the second base substrate 18 and the second polarizer 12 are stacked in sequence. Here, the light leakage and color cast problems at the side viewing angle of the liquid crystal display panel having such a structure in the L0 state may be significantly ameliorated, and the display effect thereof is good.

In a tenth manner, as shown in FIG. 6J, the first polarizer 11, the first optical compensation layer 14, the second optical compensation layer 15, the first base substrate 17, the third optical compensation layer 16, the liquid crystal layer 13, the second base substrate 18 and the second polarizer 12 are stacked in sequence. Here, the light leakage and color cast problems at the side viewing angle of the liquid crystal display panel having such a structure in the L0 state may be significantly ameliorated, and the display effect thereof is good.

In some other embodiments, the orthographic projections of the optical axes of the first liquid crystal molecules in the liquid crystal layer 13 of the liquid crystal display panel 1 on the first polarizer 11 are parallel to the transmission axis of the first polarizer 11. On this basis, both the first optical compensation layer 14 and the second optical compensation layer 15 of the liquid crystal display panel 1 are disposed on a side of the liquid crystal layer 13 proximate to the backlight module 2. On this basis, as shown in FIGS. 6D, 6E and 6F, in some examples, the liquid crystal display panel 1 may be arranged in a manner from the fourth manner to the sixth manner. In this way, the light leakage and color cast problems at the side viewing angle and the light leakage and color cast problems due to pressure applied to the liquid crystal display panel 1 in the L0 state may be significantly ameliorated, and the display effect thereof is good. As shown in FIGS. 6K, 6L, 6M and 6N, in some other examples, the liquid crystal display panel 1 may also be arranged in any of the following manners.

In an eleventh manner, as shown in FIG. 6K, the first polarizer 11, the first base substrate 17, the liquid crystal layer 13, the third optical compensation layer 16, the second optical compensation layer 15, the second base substrate 18, the first optical compensation layer 14 and the second polarizer 12 are stacked in sequence. Here, the light leakage and color cast problems at the side viewing angle of the liquid crystal display panel having such a structure in the L0 state may be significantly ameliorated, and the display effect thereof is good.

In a twelfth manner, as shown in FIG. 6L, the first polarizer 11, the first base substrate 17, the third optical compensation layer 16, the liquid crystal layer 13, the second optical compensation layer 15, the second base substrate 18, the first optical compensation layer 14 and the second polarizer 12 are stacked in sequence. Here, the light leakage and color cast problems at the side viewing angle of the liquid crystal display panel having such a structure in the L0 state may be significantly ameliorated, and the display effect thereof is good.

In a thirteenth manner, as shown in FIG. 6M, the first polarizer 11, the first base substrate 17, the third optical compensation layer 16, the liquid crystal layer 13, the second base substrate 18, the second optical compensation layer 15, the first optical compensation layer 14 and the second polarizer 12 are stacked in sequence. Here, the light leakage and color cast problems at the side viewing angle of the liquid crystal display panel having such a structure in the L0 state may be significantly ameliorated, and the display effect thereof is good.

In a fourteenth manner, as shown in FIG. 6N, the first polarizer 11, the first base substrate 17, the liquid crystal layer 13, the third optical compensation layer 16, the second base substrate 18, the second optical compensation layer 15, the first optical compensation layer 14 and the second polarizer 12 are stacked in sequence. Here, the light leakage and color cast problems at the side viewing angle of the liquid crystal display panel having such a structure in the L0 state may be significantly ameliorated, and the display effect thereof is good.

It will be noted that in any of the above embodiments, at least one of the first polarizer 11 and the second polarizer 12 has a single-layer structure or a multi-layer structure. In some examples, a polarizer with a multi-layer structure includes at least one film layer with a transmission axis. A polarization direction of light passing through the film layer is parallel to the transmission axis.

Figure 9:
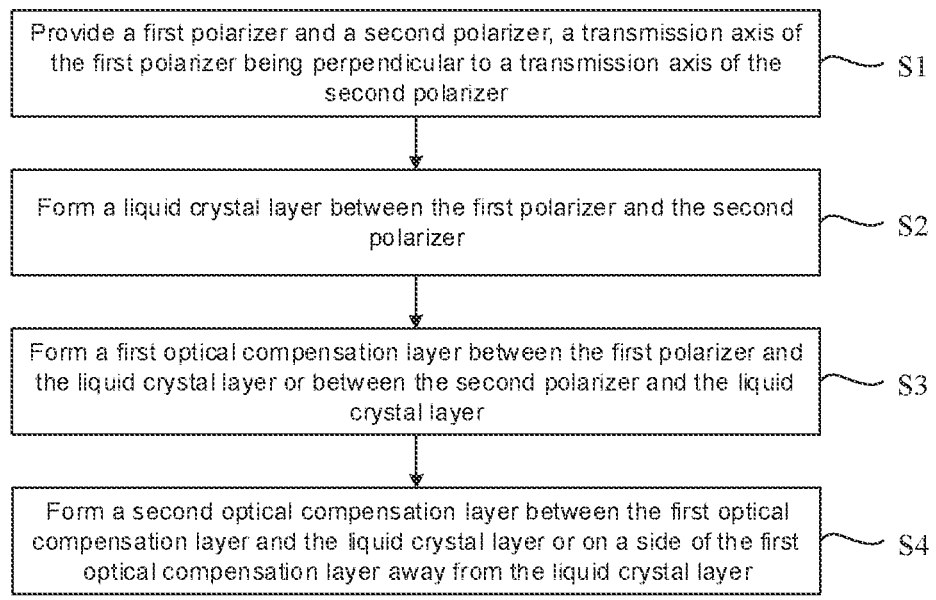
FIG. 9 is a flow diagram of a method for manufacturing a liquid crystal display panel, in accordance with some embodiments.

Referring to FIG. 9, some embodiments of the present disclosure provide a method for manufacturing a liquid crystal display panel 1. The method includes following steps (S1 to S4).

In S1, a first polarizer 11 and a second polarizer 12 are provided. A transmission axis of the first polarizer 11 is perpendicular to a transmission axis of the second polarizer 12.

In S2, a liquid crystal layer 13 is formed between the first polarizer 11 and the second polarizer 12. Here, the liquid crystal layer 13 includes first liquid crystal molecules 133'. Orthographic projections of optical axes of the first liquid crystal molecules 133' on the first polarizer 11 are parallel to the transmission axis of the first polarizer 11 or the transmission axis of the second polarizer 12.

In S3, a first optical compensation layer 14 is formed between the first polarizer 11 and the liquid crystal layer 13 or between a second polarizer 12 and the liquid crystal layer 13. Here, an orthographic projection of an optical axis of the first optical compensation layer 14 on the first polarizer 11 is perpendicular to orthographic projections of long axes of the first liquid crystal molecules in the liquid crystal layer 13 on the first polarizer 11.

In S4, a second optical compensation layer 15 is formed between the first optical compensation layer 14 and the liquid crystal layer 13 or on a side of the first optical compensation layer 14 away from the liquid crystal layer 13. Here, an optical axis of the second optical compensation layer 15 is perpendicular to a plane where the second optical compensation layer 15 is located.

By using the above method, the liquid crystal display panel 1 in some embodiments of the present disclosure can be manufactured, and the liquid crystal display panel may significantly ameliorate the light leakage and color cast problems at the side viewing angle in the L0 state and the light leakage and color cast problems due to pressure in the L0 state.

The foregoing descriptions are merely specific implementations of the present disclosure, but the protection scope of the present disclosure is not limited thereto. Changes or replacements that any person skilled in the art could conceive of within the technical scope of the present disclosure shall all be included in the protection scope of the present disclosure. Therefore, the protection scope of the present disclosure shall be subject to the protection scope of the claims.

What is claimed is:

1. A liquid crystal display panel, comprising:
a first polarizer;
a second polarizer disposed opposite to the first polarizer, a transmission axis of the first polarizer being perpendicular to a transmission axis of the second polarizer;
a liquid crystal layer disposed between the first polarizer and the second polarizer, wherein the liquid crystal layer includes first liquid crystal molecules, and in a non-powered state of the liquid crystal display panel, orthographic projections of optical axes of the first liquid crystal molecules on the first polarizer are parallel to any of the transmission axis of the first polarizer and the transmission axis of the second polarizer;
a first optical compensation layer disposed between the liquid crystal layer and any of the first polarizer and the second polarizer, wherein an orthographic projection of an optical axis of the first optical compensation layer on the first polarizer is perpendicular to the orthographic projections of the optical axes of the first liquid crystal molecules on the first polarizer;
a second optical compensation layer disposed on a same side of the liquid crystal layer as the first optical compensation layer, wherein an optical axis of the second optical compensation layer is perpendicular to a plane where the second optical compensation layer is located;
a first base substrate disposed between the first polarizer and the liquid crystal layer;
a second base substrate disposed between the second polarizer and the liquid crystal layer; and
a third optical compensation layer disposed between the first base substrate and the liquid crystal layer, or between the second base substrate and the liquid crystal layer, wherein an orthographic projection of an optical axis of the third optical compensation layer on the first base substrate is parallel to orthographic projections of optical axes of the first liquid crystal molecules in the liquid crystal layer on the first base substrate,
wherein the first optical compensation layer is disposed on a side of the first base substrate away from the liquid crystal layer or on a side of the second base substrate away from the liquid crystal layer; and a sum of an in-plane retardation of the third optical compensation layer and an in-plane retardation of the liquid crystal layer is equal to a positive integer multiple of a first wavelength, wherein the first wavelength is in a range of a difference between 535 nm and 50 nm to a sum of 535 nm and 50 nm; or
wherein the first optical compensation layer is disposed between the first base substrate and the second base substrate; and an in-plane retardation of the first optical compensation layer is $R_{O1}$, an in-plane retardation of the third optical compensation layer is $R_{O2}$, an in-plane retardation of the liquid crystal layer is $R_{OLC}$, and $R_{O1}$, $R_{O2}$ and $R_{OLC}$ satisfy a following formula:

$$R_{O2} - R_{O1} + R_{OLC} = n\lambda,$$

where n is an integer, $\lambda$ is a first wavelength, and the first wavelength is in a range of a difference between 535 nm and 50 nm to a sum of 535 nm and 50 nm.

2. The liquid crystal display panel according to claim 1, wherein the first optical compensation layer is a +A compensation film layer.

3. The liquid crystal display panel according to claim 1, wherein an in-plane retardation of the first optical compensation layer is in a range of 90 nm to 230 nm, inclusive.

4. The liquid crystal display panel according to claim 1, wherein the second optical compensation layer is a +C compensation film layer.

5. The liquid crystal display panel according to claim 1, wherein a thickness direction retardation of the second optical compensation layer is in a range of −30 nm to −180 nm, inclusive.

6. The liquid crystal display panel according to claim 1, wherein the third optical compensation layer is a +A compensation film layer.

7. The liquid crystal display panel according to claim 1, wherein in a case where the first optical compensation layer is disposed on the side of the first base substrate away from the liquid crystal layer or on the side of the second base substrate away from the liquid crystal layer, the second optical compensation layer is disposed on a side of the first optical compensation layer away from the liquid crystal layer; or
the second optical compensation layer is disposed between the first base substrate and the second base substrate; or
the second optical compensation layer is disposed between the first base substrate and the first optical compensation layer; or
the second optical compensation layer is disposed between the second base substrate and the first optical compensation layer.

8. The liquid crystal display panel according to claim 1, wherein in a case where the first optical compensation layer is disposed on the side of the first base substrate away from the liquid crystal layer or on the side of the second base substrate away from the liquid crystal layer, the in-plane retardation of the third optical compensation layer is in a range of 160 nm to 240 nm, and the in-plane retardation of the liquid crystal layer is in a range of a difference between 350 nm and 25 nm to a sum of 350 nm and 25 nm; or
the in-plane retardation of the third optical compensation layer is in a range of a difference between 185 nm and 25 nm to a sum of 185 nm and 25 nm, and the in-plane retardation of the liquid crystal layer is in a range of a difference between 350 nm and 25 nm to a sum of 350 nm and 25 nm.

9. The liquid crystal display panel according to claim 1, wherein in a case where the first optical compensation layer is disposed between the first base substrate and the second base substrate, the second optical compensation layer is disposed between the first base substrate and the second base substrate; or the second optical compensation layer is disposed on a side of the first base substrate away from the liquid crystal layer or on a side of the second base substrate away from the liquid crystal layer.

10. The liquid crystal display panel according to claim 1, wherein the liquid crystal layer includes a first alignment film and a second alignment film that are disposed opposite to each other, and a first liquid crystal molecular layer located between the first alignment film and the second alignment film;
the first alignment film is configured to anchor a part of first liquid crystal molecules proximate to the first alignment film in the first liquid crystal molecular layer, so that the part of first liquid crystal molecules proximate to the first alignment film have a first pretilt angle; and
the second alignment film is configured to anchor another part of first liquid crystal molecules proximate to the second alignment film in the first liquid crystal molecular layer, so that the another part of first liquid crystal molecules proximate to the second alignment film have a second pretilt angle;
an alignment direction of the first alignment film is the same as an alignment direction of the second alignment film; and
the third optical compensation layer includes a third alignment film and a second liquid crystal molecular layer; the third alignment film is configured to anchor a part of second liquid crystal molecules proximate to the third alignment film in the second liquid crystal molecular layer, so that the part of second liquid crystal molecules proximate to the third alignment film have a third pretilt angle;
orthographic projections of optical axes of second liquid crystal molecules in the second liquid crystal molecular layer on the first base substrate are parallel to orthographic projections of the optical axes of the first liquid crystal molecules in the first liquid crystal molecular layer on the first base substrate.

11. The liquid crystal display panel according to claim 10, wherein a direction of the first pretilt angle is the same as a direction of the second pretilt angle; and
a direction of the third pretilt angle is the same as or opposite to the direction of the first pretilt angle; or
the direction of the first pretilt angle is opposite to a direction of the second pretilt angle; and a direction of the third pretilt angle is the same as the direction of the first pretilt angle, or a direction of the third pretilt angle is the same as the direction of the second pretilt angle.

12. The liquid crystal display panel according to claim 10, wherein the first pretilt angle, the second pretilt angle and the third pretilt angle are equal in magnitude; and/or
the first pretilt angle, the second pretilt angle and the third pretilt angle are in a range of a difference between 2° and 2° to a sum of 2° and 2°; or, the first pretilt angle, the second pretilt angle and the third pretilt angle are in a range of a difference between 2° and 1° to a sum of 2° and 1°.

13. A display apparatus, comprising:
the liquid crystal display panel according to claim 1; and
a backlight module disposed on a side of the first polarizer of the liquid crystal display panel away from the liquid crystal layer of the liquid crystal display panel.

14. The display apparatus according to claim 13, wherein the orthographic projections of the optical axes of the first liquid crystal molecules in the liquid crystal layer of the liquid crystal display panel on the first polarizer are perpendicular to the transmission axis of the first polarizer; and
both the first optical compensation layer and the second optical compensation layer of the liquid crystal display panel are disposed on a side of the liquid crystal layer away from the backlight module; or
the orthographic projections of the optical axes of the first liquid crystal molecules in the liquid crystal layer of the liquid crystal display panel on the first polarizer are parallel to the transmission axis of the first polarizer; and both the first optical compensation layer and the second optical compensation layer of the liquid crystal display panel are disposed on a side of the liquid crystal layer proximate to the backlight module.

15. A method for manufacturing a liquid crystal display panel, comprising:

providing a first polarizer and a second polarizer, a transmission axis of the first polarizer being perpendicular to a transmission axis of the second polarizer;

forming a liquid crystal layer between the first polarizer and the second polarizer, wherein the liquid crystal layer includes first liquid crystal molecules, and orthographic projections of optical axes of the first liquid crystal molecules on the first polarizer are parallel to any of the transmission axis of the first polarizer and the transmission axis of the second polarizer;

forming a first optical compensation layer between the liquid crystal layer and any of the first polarizer and the second polarizer, wherein an orthographic projection of an optical axis of the first optical compensation layer on the first polarizer is perpendicular to the orthographic projections of the optical axes of the first liquid crystal molecules on the first polarizer; and forming a second optical compensation layer on a side, where the first optical compensation layer is located, of the liquid crystal layer, wherein an optical axis of the second optical compensation layer is perpendicular to a plane where the second optical compensation layer is located, wherein forming the liquid crystal layer between the first polarizer and the second polarizer includes:
providing a first base substrate and a second base substrate, and
forming the liquid crystal layer between the first base substrate and the second base substrate, wherein the first base substrate is disposed between the first polarizer and the liquid crystal layer, and the second base substrate is disposed between the second polarizer and the liquid crystal layer; and the method further comprises:

forming a third optical compensation layer between the first base substrate and the liquid crystal layer or between the second base substrate and the liquid crystal layer wherein an orthographic projection of an optical axis of the third optical compensation layer on the first base substrate is parallel to orthographic projections of optical axes of the first liquid crystal molecules in the liquid crystal layer on the first base substrate, wherein the first optical compensation layer is disposed on a side of the first base substrate away from the liquid crystal layer or on a side of the second base substrate away from the liquid crystal layer; a sum of an in-plane retardation of the third optical compensation layer and an in-plane retardation of the liquid crystal layer is equal to a positive integer multiple of a first wavelength wherein the first wavelength is in a range of a difference between 535 nm and 50 nm to a sum of 535 nm and 50 nm; or wherein the first optical compensation layer is disposed between the first base substrate and the second base substrate; and an in-plane retardation of the first optical compensation layer is $R_{O1}$, an in-plane retardation of the third optical compensation layer is $R_{O2}$, an in-plane retardation of the liquid crystal layer is $R_{OLC}$, and $R_{O1}$, $R_{O2}$ and $R_{OLC}$ satisfy a following formula:

$$R_{O2} - R_{O1} + R_{OLC} = n\lambda,$$

where n is an integer, $\lambda$ is a first wavelength, and the first wavelength is in a range of a difference between 535 nm and 50 nm to a sum of 535 nm and 50 nm.

* * * * *